US010846479B2

(12) United States Patent
Blaschak et al.

(10) Patent No.: US 10,846,479 B2
(45) Date of Patent: *Nov. 24, 2020

(54) SYSTEMS AND METHODS OF DETECTING, MEASURING, AND EXTRACTING SIGNATURES OF SIGNALS EMBEDDED IN SOCIAL MEDIA DATA STREAMS

(71) Applicant: Social Market Analytics, Inc., Chicago, IL (US)

(72) Inventors: Jeffrey G. Blaschak, Geneva, IL (US); Aleksey Blinov, Evanston, IL (US); Joseph A Gits, IV, Naperville, IL (US); Fady Harfoush, Naperville, IL (US); Kurt Myers, Chicago, IL (US)

(73) Assignee: SOCIAL MARKET ANALYTICS, INC., Naperville, IL (US)

( * ) Notice: Subject to any disclaimer, the term of this patent is extended or adjusted under 35 U.S.C. 154(b) by 209 days.

This patent is subject to a terminal disclaimer.

(21) Appl. No.: 16/018,953

(22) Filed: Jun. 26, 2018

(65) Prior Publication Data
US 2018/0373703 A1    Dec. 27, 2018

Related U.S. Application Data

(63) Continuation of application No. 14/716,116, filed on May 19, 2015, now Pat. No. 10,031,909, which is a
(Continued)

(51) Int. Cl.
*G06F 40/30*        (2020.01)
*G06F 16/2457*    (2019.01)
(Continued)

(52) U.S. Cl.
CPC ........ *G06F 40/30* (2020.01); *G06F 16/24578* (2019.01); *G06F 40/221* (2020.01);
(Continued)

(58) Field of Classification Search
USPC ........................................ 707/751, 790, 722
See application file for complete search history.

(56) References Cited

U.S. PATENT DOCUMENTS 6,073,135 A * 6/2000 Broder ................. G06F 16/954
7,996,210 B2 * 8/2011 Godbole ................ G06F 40/35
704/9
(Continued)

OTHER PUBLICATIONS

Examination Report from the European Patent Office in corresponding application No. EP 13746301.4 dated Sep. 17, 2018.
(Continued)

*Primary Examiner* — Hung T Vy
(74) *Attorney, Agent, or Firm* — Hahn Loeser & Parks LLP

(57) ABSTRACT

A system for scoring micro-blogging messages is provided, including an extractor, and evaluator, a calculator, and a publisher. The extractor may be configured to receive micro-blogging messages, to detect messages containing terms of interest, to extract raw data, and to store the data in a database. The evaluator may be configured to access and parse the stored data into tokenized data, and to store the tokenized data in a database. The evaluator may also be configured to identify relevant micro-blogging messages; to tag message as indicative; and to filter messages from low-volume or malicious sources before being tagged as indicative. The calculator may be configured to access a sentiment dictionary; to calculate a sentiment score of the tokenized data, and to calculate a sentiment signature for a term of interest. The publisher may be configured to provide access to clients of the system.

18 Claims, 22 Drawing Sheets

Related U.S. Application Data continuation of application No. 13/761,859, filed on Feb. 7, 2013, now Pat. No. 9,104,734.

(60) Provisional application No. 61/595,975, filed on Feb. 7, 2012.

(51) Int. Cl.

| | | |
|---|---|---|
| *G06Q 30/02* | (2012.01) | |
| *G06F 40/221* | (2020.01) | |
| *H04L 12/58* | (2006.01) | |
| *G06Q 50/00* | (2012.01) | |
| *G06Q 40/00* | (2012.01) | |

(52) U.S. Cl.
CPC ......... *G06Q 30/0203* (2013.01); *H04L 51/32* (2013.01); *G06Q 40/00* (2013.01); *G06Q 50/01* (2013.01)

(56) References Cited

U.S. PATENT DOCUMENTS

| | | | |
|---|---|---|---|
| 8,719,302 B2* | 5/2014 | Bailey | G06F 16/95 707/790 |
| 8,751,427 B1* | 6/2014 | Mysen | H04L 67/306 706/46 |
| 2008/0270116 A1 | 10/2008 | Godbole et al. | |
| 2009/0125371 A1 | 5/2009 | Neylon et al. | |
| 2009/0319342 A1 | 12/2009 | Shilman et al. | |
| 2009/0319518 A1 | 12/2009 | Koudas et al. | |
| 2010/0114899 A1 | 5/2010 | Guha et al. | |
| 2010/0119053 A1 | 5/2010 | Goeldi | |
| 2010/0211868 A1 | 8/2010 | Karmarkar et al. | |
| 2010/0312769 A1 | 12/2010 | Bailey et al. | |
| 2011/0078167 A1 | 3/2011 | Sundaresan et al. | |
| 2011/0137906 A1 | 6/2011 | Cai et al. | |
| 2011/0161071 A1 | 6/2011 | Duong-van | |
| 2011/0207482 A1 | 8/2011 | Shamma et al. | |
| 2011/0246179 A1 | 10/2011 | O'Neil | |
| 2011/0258256 A1 | 10/2011 | Huberman et al. | |
| 2012/0041937 A1 | 2/2012 | Dhillon et al. | |
| 2012/0078884 A1* | 3/2012 | Callari | G06F 16/9535 707/722 |
| 2012/0101808 A1 | 4/2012 | Duong-Van | |
| 2012/0136985 A1 | 5/2012 | Popescu et al. | |
| 2012/0179692 A1* | 7/2012 | Hsiao | G06F 16/34 707/748 |
| 2012/0323627 A1 | 12/2012 | Herring, Jr. et al. | |
| 2013/0073480 A1 | 3/2013 | Sastri et al. | |

OTHER PUBLICATIONS

International Search Report from the Patent Cooperation Treaty Office in corresponding application No. PCT/US13/25159 dated Apr. 17, 2013.
Written Opinion of the International Searching Authority from the Patent Cooperation Treaty Office in corresponding application No. PCT/US13/25159 dated Apr. 17, 2013.
International Preliminary Report on Patentability from the Patent Cooperation Treaty Office in corresponding application No. PCT/US13/25159 dated Aug. 12, 2014.
Extended European Search Report in corresponding application No. EP 13746301.4 dated Aug. 28, 2015.
Parr, Twitter See what people are saying about, http://mashable.com/2010/02/22/twitter-50-million-tweets/, 2010.
Asure, et al., Predicting the Future with Social Media, pp. 1-8; Mar. 29, 2010.
Barbosa, et al., Robust Sentiment Detection on Twitter from Biased and Noisy Data, Coling 2010, Poster Volume, Beijing, Aug. 2010, pp. 36-44.
Bollen, et al., Modeling Public Mood and Emotion: Twitter Sentiment and Socio-Economic Phenomena; Proceedings of the Fifth International AAAI Conference on Weblogs and Social Media; 2011; pp. 450-453.
Bollen, et al., Twitter Mood Predicts the Stock Market Journal of Computational Science 2(2011) 1-8 U.S.
Paul, et al., You are What You Tweet: Analyzing Twitter for Public Health; Association for the Advancement of Artificial Intelligence; 2011, pp. 1-8.
Aramaki, et al., Twitter Catches the Flu: Detecting Influenza Epidemics Using Twitter; Proceedings of the 2011 Conference on Empirical Methods in Natural Language Processing, Scotland, UK Jul. 27-31, 2011; pp. 1568-1576.
Tsotsis, Twitter is at 250 Million Tweets Per Day, iOS 5 Integration Made Signups Increase 3x, http://techcrunch.com/2011/10/17/twitter-is-at-250-million-tweets-per-day/, 2011.
Mao, et al., Predicting Financial Markets: Comparing Survey, News, Twitter and Search Engine Data: Dec. 5, 2011, pp. 1-10.

\* cited by examiner

SUMMARY_BY_TICKER
as_of_date TIMESTAMP
ticker varchar(8)
sector varchar(50)
industry varchar(50)
Raw-S double
Raw-mean double
Raw-Volatility double
Raw-Score double
S double
S-Mean double
S-Volatility double
S-Score double
S-Volume double
SV-Mean double
SV-Volatility double
SV-Score double
S-Buzz double
S-Dispersion double
S-Delta double
Center_date date
Center_time time
Center_tz varchar(10)

FIG. 4B

| S-SCORE RANGE | RETURN | SHARPE RATIO |
|---|---|---|
| S-SCORE > 2 | 17.19% | 1.325 |
| 1 < S-SCORE < 2 | 8.05% | .637 |
| UNIVERSE | 4.50% | .3639 |
| SP 500 (SPY) | 4.038% | .3032 |
| -2 < S-SCORE < -1 | -1.845% | -.1452 |
| S-SCORE < -2 | -16.41% | -1.075 |

FIG. 9

SYSTEMS AND METHODS OF DETECTING, MEASURING, AND EXTRACTING SIGNATURES OF SIGNALS EMBEDDED IN SOCIAL MEDIA DATA STREAMS

This application claims priority to and is a continuation of U.S. application Ser. No. 14/716,116, patented as U.S. Pat. No. 10,031,909, titled SYSTEMS AND METHODS OF DETECTING, MEASURING, AND EXTRACTING SIGNATURES OF SIGNALS EMBEDDED IN SOCIAL MEDIA DATA STREAMS; which is a continuation of U.S. application Ser. No. 13/761,859, patented as U.S. Pat. No. 9,104,734, titled SYSTEMS AND METHODS OF DETECTING, MEASURING, AND EXTRACTING SIGNATURES OF SIGNALS EMBEDDED IN SOCIAL MEDIA DATA STREAMS; and is a continuation-in-part of U.S. Provisional Application Ser. No. 61/595,975, titled SYSTEMS AND METHODS OF DETECTING, MEASURING, AND EXTRACTING SIGNATURES OF SIGNALS EMBEDDED IN SOCIAL MEDIA DATA STREAMS, the disclosure of which is incorporated by reference.

BACKGROUND

The epic growth of the social web has created rich data sources for predictive analytics. The enormous volume and diversity of information propagating amongst large user communities on micro-blogging platforms, Twitter in particular, and the emergence of social media data aggregation service providers such as GNIP, Topsy, and StockTwits, enable new, intriguing opportunities to leverage the information content embedded in social media. In addition to providing huge volumes of minable data for diverse commercial applications, social media sources enable real-time detection, surveillance, and estimates of social media signatures for events and entities, thus extending the transformation of these data beyond estimation of the social media "sentiment" expressed for an entity.

The current practice of social media analytics has strongly focused on techniques to estimate the sentiment component of an entity's signature. These techniques employ methods from the discipline of Natural Language Processing (NLP), in varying degrees and complexity, to produce coarse grained sentiment estimates, oriented in terms of "Positive", "Negative", or "Neutral" for an entity. One disadvantage of coarse gained estimates is that they are highly sensitive to the thresholds selected to determine the entity's possible three state outcome. Further, such discrete estimates are not suitable to time series normalization techniques, which allow the detection of changes from an entity's normal sentiment levels or the comparison of one entity's sentiment level to another entity's level on a common measurement basis. The level of social media activity is also an important component of an entity's social media signature. Current analytic techniques estimate an entity's level or intensity of social media activity by counting the total number of "mentions" of the entity present in micro-blogging data streams observed during a time interval or converting the total to an average value observed over the interval. However, an activity metric driven solely by the total number of counts does not readily show significant deviations from the entity's normal level of social media activity, nor does such a representation allow for comparison of one entity's activity level to another entity's level on a common basis. An example from the domain of stock trading is Apple Inc., stock symbol AAPL, which is consistently the most frequently mentioned stock on Twitter. A comparison of the total number of tweets observed during a day for AAPL to the total number observed for a stock with less activity, such as Caterpillar Inc. (CAT), is not useful because tweet volumes for AAPL will always dominate, compared to CAT, over any observation interval.

SUMMARY

In one aspect of the present invention, certain disadvantages of known techniques may be remedied by measuring an entity's sentiment on a continuous, normalized scale, enabling entity-to-entity comparisons and detection of changes in an entity's sentiment level relative to a sentiment universe, such as a broad market sentiment index or a market sector sentiment index as an example drawn from the financial markets and trading application domain. In another aspect of the present invention, certain disadvantages of known techniques may be remedied by expressing a stock ticker's level of social media activity on a continuous, normalized scale, enabling the direct comparison to other stocks, using a common metric, and the detection of significant changes of the stock ticker's activity level relative to the constituents of a market sector or broad market index.

In one example, a system for scoring micro-blogging messages includes a private infrastructure and a public infrastructure. The private infrastructure includes an extractor, and evaluator, a calculator, and a publisher. The extractor may be configured to receive micro-blogging messages via an application programming interface of at least one micro-blogging source, to access a set of terms of interest, to detect received micro-blogging messages having least one of the terms of interest, to extract raw data from the micro-blogging messages, and to store the extracted raw data in a private database, the extracted raw data including at least a posting account, a posting time, and message contents.

The evaluator may be configured to access the stored raw data, to parse the stored raw data into tokenized data, and to store the tokenized data in the private database. The evaluator may also be configured to detect terms of interest mentioned in the tokenized data to identify relevant micro-blogging messages, to tag in the private database micro-blogging messages that contain a term of interest as being relevant to that term of interest, and using a posting account of a micro-blogging message to tag the micro-blogging message as indicative. Micro-blogging messages may be filtered to exclude micro-blogging messages from low-volume or malicious sources before the remaining messages are tagged as indicative. The evaluator may also be configured to eliminate duplicate micro-blogging messages.

The calculator may be configured to access a sentiment dictionary and to access the stored tokenized data of micro-blogging messages tagged as indicative. The calculator may be further configured to calculate a sentiment score based on sentiment values of words and phrases in the tokenized data for micro-blogging messages tagged as indicative, and to calculate a vector of sentiment metrics for a term of interest based on the sentiment scores associated with the term of interest and falling within a predetermined lookback period, the calculator further configured to store the vector of sentiment metrics in the private database. The publisher may be configured to access the vectors of sentiment metrics corresponding to a plurality of micro-blogging messages and to provide access to the vectors of sentiment metrics.

The public infrastructure may include a public database, the public database being populated with vectors of sentiment metrics from the publisher and providing access to the sentiment metric to clients of the system for scoring micro-blogging messages.

In one example, the vector of sentiment metrics comprises at least a normalized representation of a sentiment time series score over the predetermined lookback period, a smoothed weighted average of a sentiment time series score over the predetermined lookback period, a volume of indicative micro-blogging messages, and a change in volume of indicative micro-blogging messages relative to the average volume level of relevant micro-blogging messages. In another example, the vector of sentiment metrics comprises at least a normalized representation of a sentiment time series score over the predetermined lookback period and a measure of diversity of posting accounts contributing to the sentiment time series score. In another example, the vector of sentiment metrics comprises at least a normalized representation of a sentiment time series score over the predetermined lookback period and a measure of the change in sentiment volume relative to the average level observed for a sentiment Universe.

The vector of sentiment metrics may further comprise a plurality of vectors of sentiment metrics, wherein each vector represents sentiment metrics calculated periodically according a predetermined calculation interval. In one example, the calculation interval is 15 minutes and the lookback period is a number of days.

In another example, a system for scoring micro-blogging messages may be implemented in a relational database having a term table, a message table, a digest table, a digest score table and a sentiment dictionary. The system may also include an extractor, an evaluator, and a calculator.

The term table includes a set of terms of interest, such as but not limited to stock ticker symbols. The extractor, may be configured to receive micro-blogging messages via an application programming interface of at least one micro-blogging source, to detect received micro-blogging messages having least one of the terms of interest, to extract raw data from the micro-blogging messages, and to store the extracted raw data in a message table in the database, the extracted raw data including at least a posting account, a posting time, and message contents.

The evaluator may be configured to access the stored raw data in the message table, to parse the stored raw data into tokenized data, to store the tokenized data in a digest table, to detect terms of interest mentioned in the tokenized data, to analyze the raw data for indications of relevance, and to flag indicative micro-blogging messages in a digest score table.

The sentiment dictionary may include sentiment values associated with words and phrases commonly expressed in relevant micro-blogging messages. The sentiment dictionary may be included with the calculator.

The calculator may be configured to access a sentiment dictionary and to access the stored digest score table. The calculator may be further configured to calculate a sentiment score based on sentiment values of words and phrases in the tokenized data for micro-blogging messages tagged as indicative, and to calculate a vector of sentiment metrics for a term of interest based on the sentiment scores associated with the term of interest and falling within a predetermined lookback period. The calculator may be further configured to store the vector of sentiment metrics in a vector table. In one example, at least one of the sentiment metrics comprises a normalized representation of a sentiment time series score.

BRIEF DESCRIPTION OF THE DRAWINGS

FIG. 4a-4b shows a condensed schema of a Private database and a Public database which may be used in one example of the present invention.

FIG. 9 shows risk adjusted performance measures, in terms of Sharpe Ratios, for the cumulative portfolio returns shown in FIG. 8.

DETAILED DESCRIPTION

Various aspects of the invention disclosed in the examples provided herein relate generally to the field of social media analytics and specifically to the detection and measurement of the signature of terms of interest as expressed in social media data sources such as the micro-blogging platform, Twitter. One particularly advantageous domain of application is the financial markets and the entities are the stocks of companies of interest to financial market traders and investors. Various aspects of the invention provide a framework and methods to extract and interpret sentiment signatures for the stocks of companies as expressed in the Twitter messaging stream. This framework can be extended and adapted to other application domains, such as media, marketing, and healthcare, where the expression of sentiment through social media is important Throughout the description, for the purposes of explanation, specific details are set forth in order to provide a thorough understanding of the present disclosure. It will be apparent, however, to one skilled in the art that the present disclosure may be practiced without some of these specific details.

Figure 1:
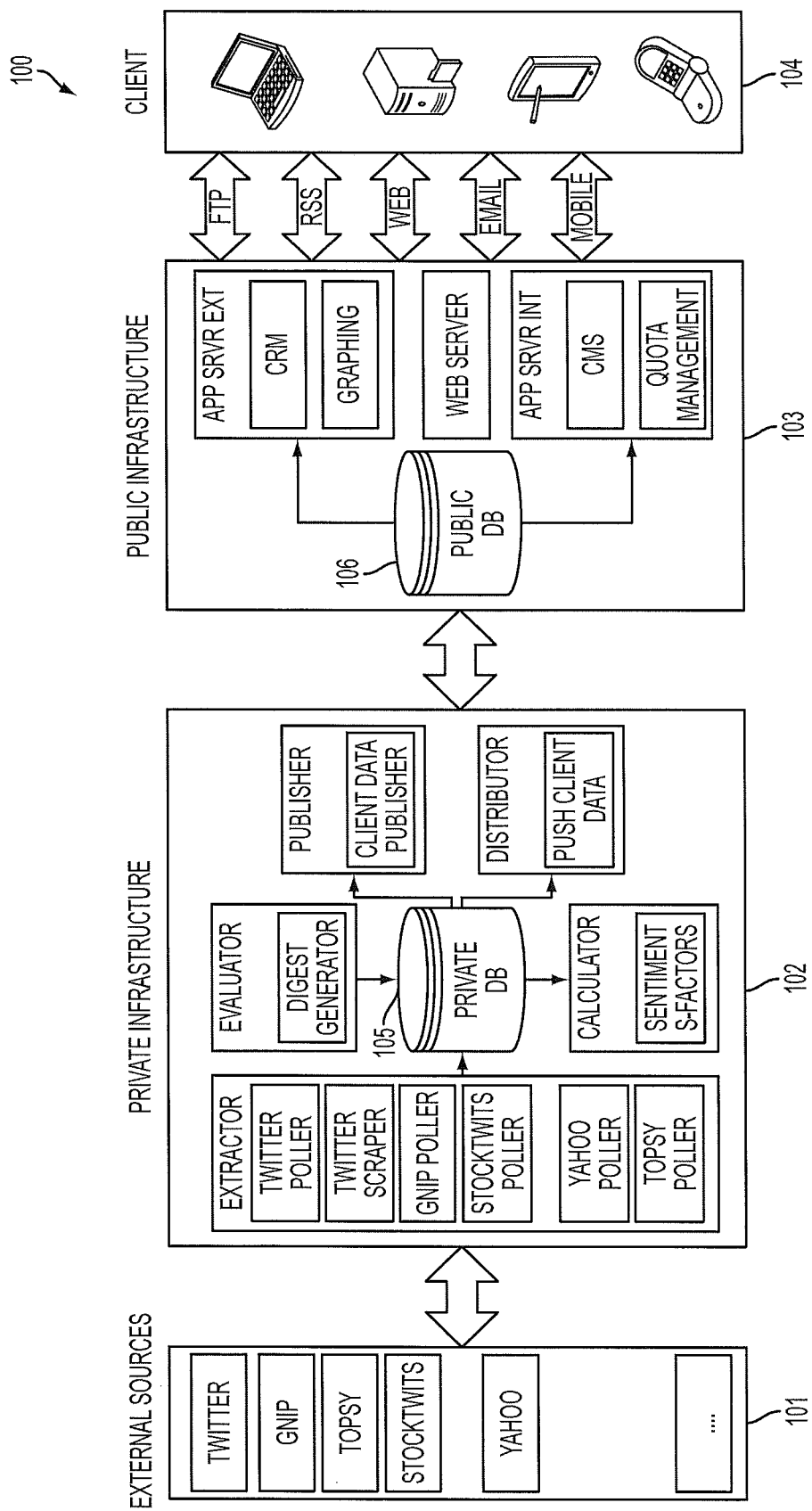
FIG. 1 is a block diagram of the system architecture of the social media signature analysis system according to one example of the present invention.

FIG. 1 shows the block diagram 100 of one example of a system architecture of a sentiment signature analysis system of the present invention. The architecture is comprised of a Private Infrastructure 102 and a Public Infrastructure 103. The Private Infrastructure 102 may comprise a general purpose computer configured with a relational database. The relational database may comprise a MySQL database. The Private Infrastructure 102 collects micro-blogging messages corresponding to terms of interest. In one advantageous example, the terms of interest correspond to publicly traded entities. Terms of interest may be defined by a Universe of stock ticker symbols. In one example, the Universe is an extended set of stock ticker symbols modeled after the constituents of the Russell 3000 index. It is contemplated that ticker symbols from European and Asian markets may also be included. The Private Infrastructure 102 may continuously cycle through the Universe list, polling Twitter, directly, or micro-blogging data aggregation providers (including ONIP, Topsy, StockTwits) 101 for messages containing commentary on the list members. Price quote data for the members of the stock Universe may be obtained by polling Yahoo! Finance or other suitable information source. The Private Infrastructure 102 extracts micro-blogging messages, herein referred to by their common name as "tweets"; evaluates the relevance of the received tweets to the stocks symbols of interest; calculates the sentiment score of the received tweets and their contribution to vectors of sentiment metrics referred to herein as sentiment signatures, for the members of the Universe list; stores the results of scoring and signature analysis in the relational database; and finally distributes the signature results to the Public Infrastructure 103 via FTP transfer for public client access and also publishes the signature results via an API for private client access.

The Public Infrastructure 103 maintains a relational database 106 of sentiment signature results and enables public client access 104 to real-time and historical sentiment signatures for stocks that are members of the Universe list. The relational database 106 may comprise a MySQL database or any other suitable relational database. The Public Infrastructure may further comprise a web server configured with HTML code and/or PHP scripts. Public clients are able to access sentiment estimates using a web browser interface; access sentiment estimates using mobile devices, tablets and smartphones; receive daily pre and post market sentiment reports via email; establish stock watch lists to set sentiment signature alerts levels and receive email alerts if sentiment thresholds or target values are met for stocks on a client's watch list; receive real-time sentiment signatures by subscription to an RSS feed; or access historical sentiment signature data via an FTP interface.

Figure 2:
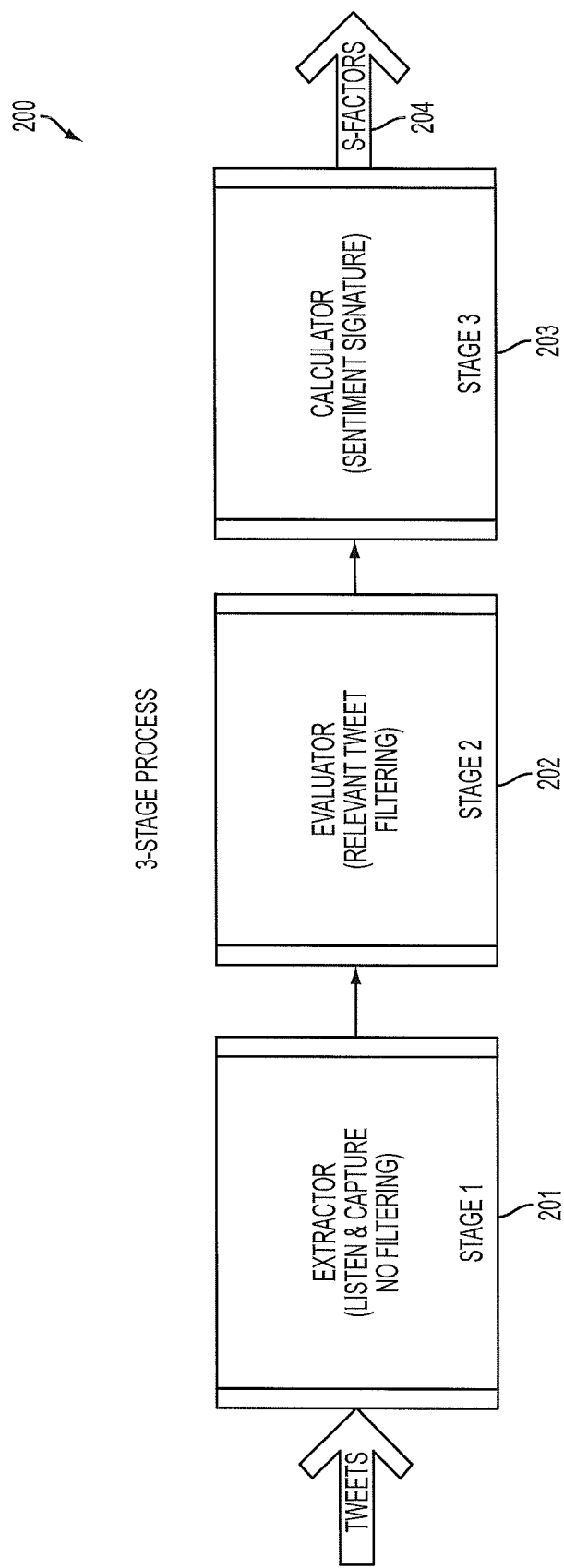
FIG. 2 is a block diagram of the system data flow according to one example of the present invention.

FIG. 2 is a data flow diagram 200 to illustrate the three stages needed to transform the tweet data stream into sentiment signatures for the stock Universe. The Extractor 201 polls the Twitter API or the API's of the micro-blogging data aggregators (as illustrated in FIG. 1) and captures groups of tweets that mention the stocks of interest. These raw, captured tweets populate tables in the Private database 105. The Evaluator 202 analyzes each tweet and develops a list of tweets with financial market relevance to the terms of interest, in this example, stock ticker symbols. These are called "indicative" tweets, as these indicate expressions of market trading sentiment for these stocks, and are passed to the Calculator 203, which determines their contribution to the sentiment signatures. In one example, The Extractor 201, Evaluator 202 and Calculator 203 may be implemented as JAVA applications. Other programming environments or languages suitable for interfacing with a relational database may also be used.

One example of a vector of sentiment metrics is known as S-Factors. S-Factors are a family of metrics 204, which measure and represent the social media signature of an entity as a function of time. S-Factors are defined as follows.

S-Score is the normalized representation of a sentiment time series, S(t), over a lookback period of W days. S(t) is computed by summing the sentiment level of all indicative tweets, N, contributing to an entity's sentiment signature during an observation interval, [t−L, t], where L is the length of the interval.

$$S(t) = \sum_{i=1}^{N} Sentiment_{tweet}(t_i) \quad \text{Equation (1)}$$

where: $t - L < t_i < t$

S-Score is the z-score representation of the time series, S(t), created to establish a common scale according to a local mean and standard deviation within a sliding window of W days before time, t.

$$S_{Score}(t) = \frac{S(t) - \mu(S(t))}{\sigma(S(t))} \quad \text{Equation (2)}$$

where, μ and σ are the mean and standard deviation of S(t) within the lookback period, [t−W, t]. It is important that this normalization use data only from the lookback period and does not include data from times after t, as this would inject a "look ahead" bias in the normalized time series.

The z-score representation transforms a time series to show fluctuations around a zero mean level and expressed on a scale of 1 standard deviation. The z-score representation enables entity-to-entity comparisons of sentiment on a common measurement scale. S-Score is a measure of sentiment deviation from a normal state. Typical values range from −2 to 2, with values greater than 4 or less than −4 indicating extreme positive or negative states.

S-Scores are computed either weighted or un-weighted with respect to the arrival times of contributing tweets. Un-weighted means the contributing tweet scores are used directly as the summation is evaluated. Weighted means exponential scaling is applied to place stronger emphasis on recently arrived tweets as the summation is evaluated. A tweet's sentiment score is scaled by an exponential weight function that varies as a function of the arrival time. The weight function has a maximum at the time of the stock's sentiment estimate and decreases smoothly to a minimum at the start of the observation window, L periods prior.

S-Mean is a smoothed weighted average of a sentiment time series, S(t), over a lookback period of W days.

$$S_{Mean}(t) = \frac{1}{W} \sum_{i=1}^{W} \alpha_i S(t_i) \quad \text{Equation (3)}$$

where: $t - W < t_i < t$, $\alpha_i$ is a weight function

S-Mean is viewed as a measure of the current normal sentiment state. A change in S-Mean is a sign of a change in trend. It is not a measure of intensity but rather of a directional change. Typical values range between 0 and 4 with the majority less than 1.

S-Delta is the percent change in S-Score over a lookback period of W days, and is a first order measurement of the sentiment trend. A monotonic S-Delta over a short period of time can be a stronger indicator of changing sentiment levels.

$$S_{Delta}(t) = \frac{S_{Score}(t) - S_{Score}(t-W)}{S_{Score}(t)}.$$ Equation (4)

S-Volatility is a percent measurement of the variability of the sentiment level over a lookback period of W days.

$$S_{Volatility}(t) = \sigma(S_{score}(t)).$$ Equation (5)

where, $\sigma$ is the standard deviation of S-Score within the lookback period, [t−W, t].

S-Volume is the volume of indicative tweets contributing to a sentiment signature at an observation time, t. This metric has a range between 10 and 1,000 for most stocks. Note that actual tweets volume can be 10× or greater. The Evaluator 202 imposes a strong filter and only allows tweets that have financial market relevance to contribute to a stock's sentiment signature. A rapid change in S-Volume is a good indication of unusual social media activity, but not necessarily of a change in sentiment level. Many times S-Volume is dominated by the most active securities in social media such as AAPL, GOOG, or AMZN. A better indicator is S-Volume-z, the z-score normalized representation of the S-Volume time series over a lookback period of W days, $$S_{Volume-z}(t) = \frac{S_{Volume}(t) - \mu(S_{Volume}(t))}{\sigma(S_{Volume}(t))}.$$ Equation (6)

This representation enables the direct comparison of the activity of any stock to another, using a common basis, and the detection of significant changes of a stock's activity level relative to the constituents of a market sector or broad market index.

S-Dispersion is a measure of the diversity of the Twitter users that are the source of indicative tweets contributing to a stock's sentiment signature. A dispersion level of 1 indicates that all indicative tweets come from distinct sources. A value near 0 implies that all counts originate from one or a small number of distinct sources.

$$S_{Dispersion}(t) = \frac{\# \text{ of contributing sources at time, } t}{\# \text{ of indicative tweets at time, } t}$$ Equation (7)

All else being equal, a high S-Dispersion is in general desirable compared to a low level, indicating that a diverse range of sources contribute to a stock's sentiment signature. The case of low S-Dispersion warrants a closer look to assess validity or credibility of the contributing sources.

S-Buzz is a measurement of abnormal activity. It compares a stock's change in sentiment volume to the average volume level for the sentiment Universe. Typical values range from 1 to 3, with 0 indicating almost no activity and 1 indicating normal activity. Values greater than 3 indicate an extreme, unusual level of social media activity relative to the Universe.

At any time, t, $$S_{BUZZ}(t) = \sqrt{A(t) - B}$$ Equation (8)

Here, $$A(t) = \frac{S_{Volume}(t) - \mu(S_{Volume}(t = 9:10 \text{ AM ET}))}{\sigma(S_{Volume}(t = 9:10 \text{ AM ET}))}$$ Equation (9)

B is the average S-Volume-z for the Universe @ 9:10 AM Eastern Time.

Where, $\mu$ and $\sigma$ are the mean and standard deviation within the lookback interval, [t−W, t].

Figure 3:
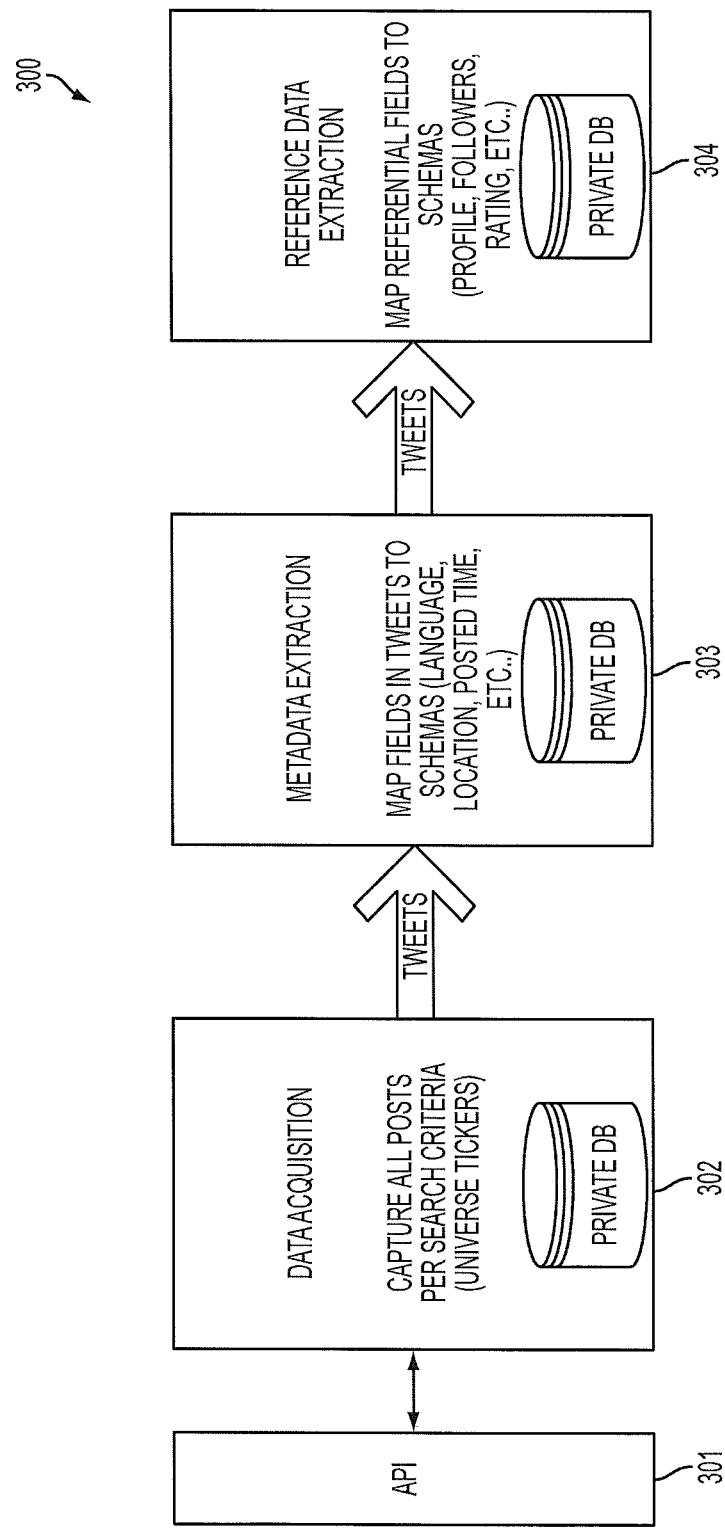
FIG. 3 is a block diagram of an Extractor stage according to one example of the present invention.
Figure 4A:
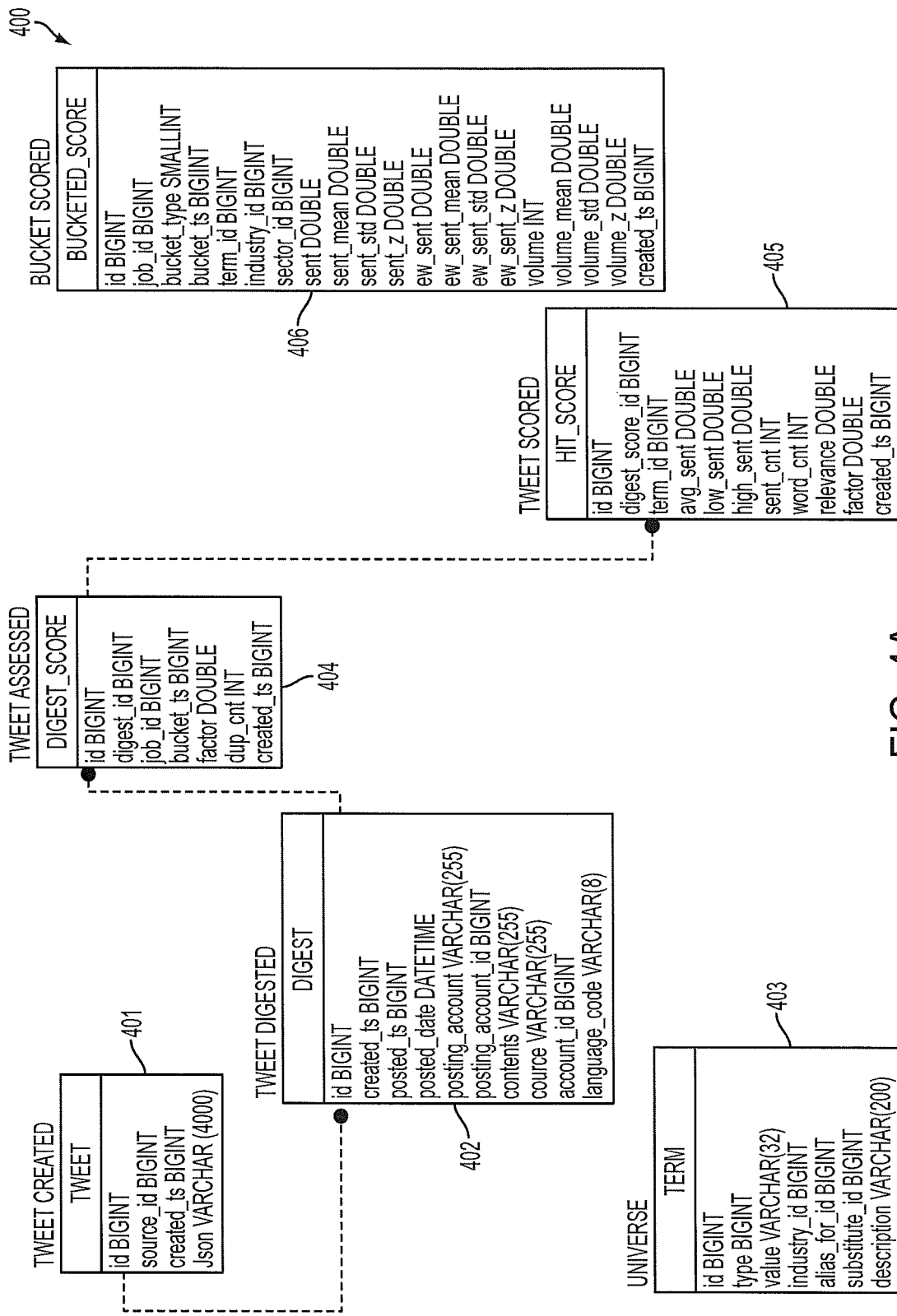

FIG. 3 presents detail on the Extractor stage 300 of the processing pipeline. Data Acquisition 302 continuously polls the Twitter API 301 or the API's of the micro-blogging data aggregation providers to capture tweets containing commentary on the members of the stock Universe. FIG. 4a is a condensed database schema showing data models for tweet capture, sentiment scoring, and signature estimates. The stock Universe is defined in the TERM table 403 (FIG. 4a). Data Acquisition 302 receives tweets as JSON document objects and populates the TWEET table 401 (FIG. 4a). Metadata Extraction 303 and Reference Data Extraction 304 extract features of the tweets (language, location, posting time) and features of the Twitter user account that originated the tweets (user profile, followers, account rating) to populate the DIGEST table 402 (FIG. 4a).

Figure 5:
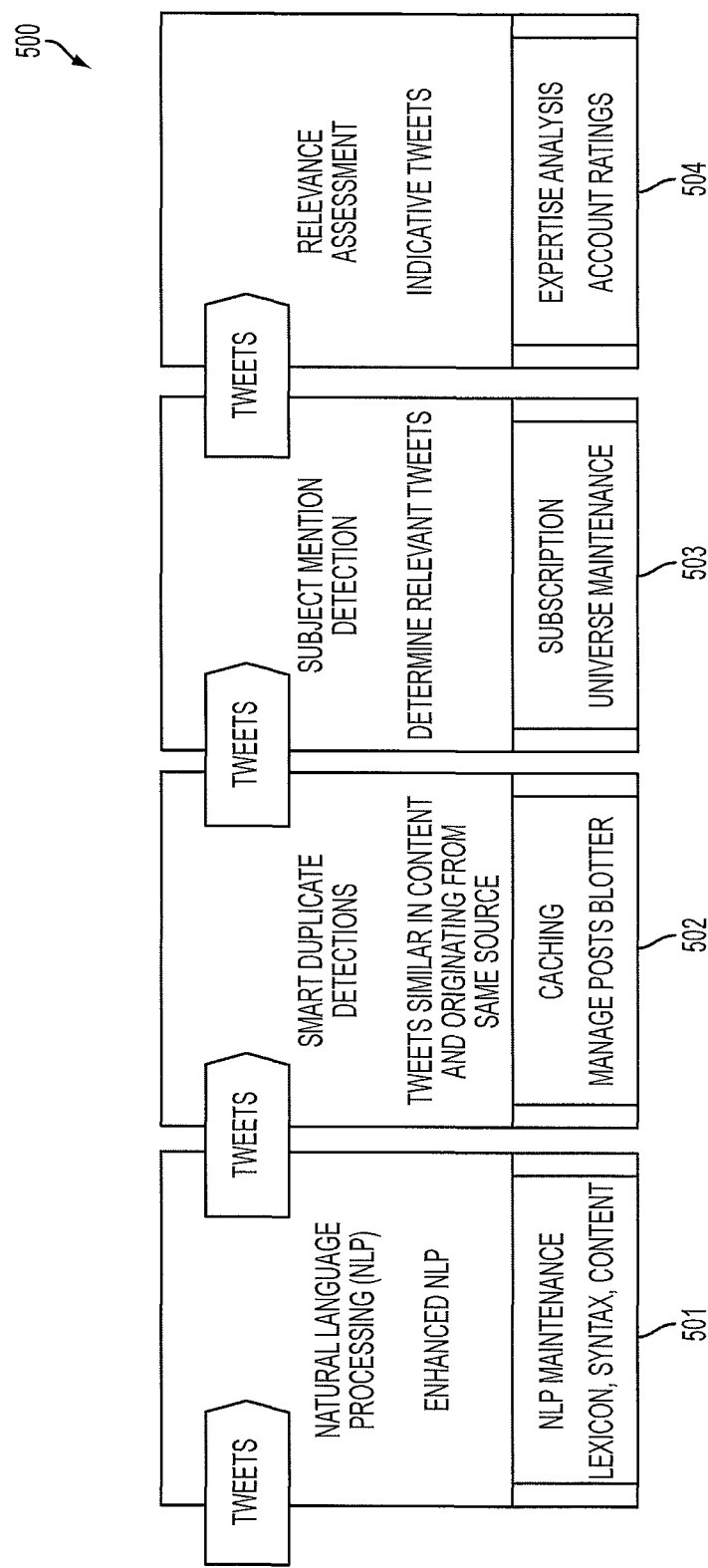
FIG. 5 is a block diagram of an Evaluator stage according to one example of the present invention.

FIG. 5 presents detail on the Evaluator stage 500 of the processing pipeline. The goal of the Evaluator stage is to identify indicative tweets with sentiment scores that will contribute to an entity's sentiment signature. A Natural Language Processing step (NLP) 501 may use known language parser tools such as nlp.stanford.edu/downloads/lex-parser.shtml, which may be adapted for use in the domain of financial markets. The NLP performs tokenization of tweet text to identify words, phrases, and stock symbols in the captured tweets. The tokenized tweets are passed to the Duplicate Detection process 502, which works to eliminate duplicate tweets submitted from the same source and to identify the occurrence and sources of "re-tweets". A re-tweet (re-blogging a message) is an acknowledgement of a tweet by Twitter users other than the tweet's originator and are considered to be endorsements by the wider community of a tweet's content Duplicate Detection 502 and re-tweet policies work to reduce the influence of tweets originating from "spamming" users, reducing the noise level of the tweet stream and improving signature estimates.

Subject Mention Detection 503 identifies the specific entities mentioned in the text of the tweets. Tweets having content that mentions members of the sentiment Universe are labeled as "relevant" and are tagged for the corresponding entities. Relevance Assessment 504 is the final step and proceeds to analyze the set of relevant tweets with respect to ratings, developed by the disclosed invention, for the Twitter accounts that are the originators of the captured tweets. Operational experience has shown that 90% of the tweets, determined to be relevant, originate from about 10% of the observed Twitter accounts. The 10% portion of accounts that present relevant content are also high volume accounts, meaning that these accounts have much higher total number and frequency of tweets presented over time compared to other accounts. Further, accounts originating tweets that have content determined to be NOT relevant are typically from low volume, sporadically active Twitter users. A filter may be applied to eliminate tweets from low volume originators, or originators determined to be malicious, transforming the set of relevant tweets to the set of indicative tweets for the entities that will be used in the signature estimation stage. The result of the Evaluator stage 500 populates the DIGEST SCORE table 404 (FIG. 4a).

Figure 6:
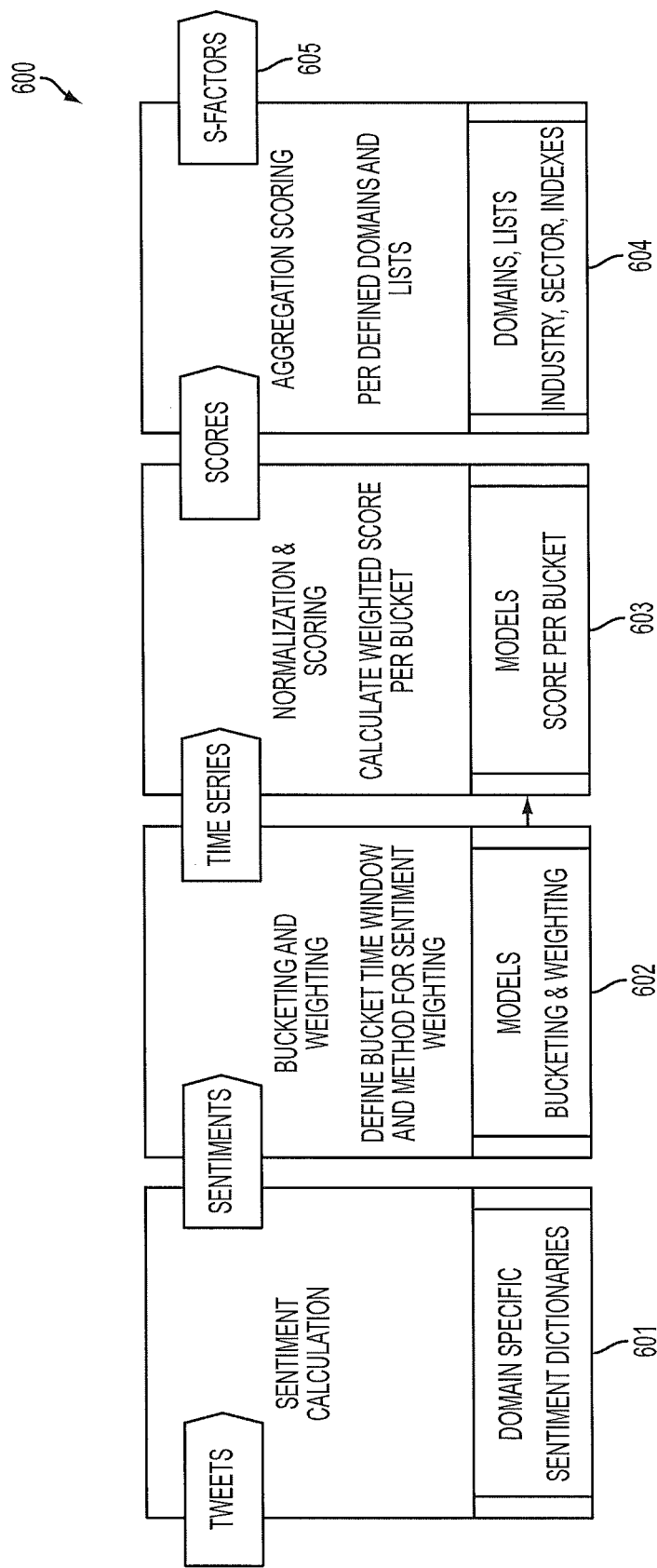
FIG. 6 is a block diagram of a Calculator stage according to one example of the present invention.

FIG. 6 presents detail on a Calculator stage 600 of the processing pipeline. The set of indicative tweets is received by the Sentiment Calculation 601. Sentiment Calculation accesses the tokenized results for each tweet, which identifies word boundaries and specific word content. The sentiment level for each word parsed from a tweet is obtained from a Domain Specific Sentiment Dictionary. Sentiment Dictionary may be tuned for performance in the financial market domain. In one example, the Sentiment Dictionary has 18,000 words (uni-grams) and 225 two word phrases (bi-grams) that have content and sentiment levels adapted to financial market terminology as expressed in micro-blogging messages.

Thus, for a tweet containing n identified words and m identified two word phrases, the tweet's sentiment score is the average value of the total identified sentiment content, $$Sentiment_{tweet} = \frac{1}{m+n}\left(\sum_{i=1}^{n} Sentiment_{word}(i) + \sum_{j=1}^{m} Sentiment_{phrase}(j)\right)$$

Equation (10)

For an entity at time, t, the sentiment inferred from its associated indicative tweets has been stated previously. Results are stored in the HIT_SCORE table 405 (FIG. 4a).

Bucketing and Weighting 602 takes all scores for an entity's indicative tweets and groups these into time period buckets based on the created time stamps of the tweets as defined in the HIT_SCORE table 405 (FIG. 4a). For the i-th indicative tweet, a weight function is applied to the tweet's sentiment score, as $$w_i(t) = 1 \text{(no weighting) OR } e^{(t_{arrival}-t)} \text{(exponential weighting)}$$

Equation (11)

with exponential weighting placing more emphasis on recently arrived tweets.

Normalization and Scoring 603 calculates the S-Score and other metrics defined previously. Aggregation Scoring 604 calculates S-Score and other metrics for market indices, market sectors and industry groups by aggregating the S-Scores of the constituent entities. The results populate the BUCKETED_SCORE table 406 (FIG. 4a). These processes are performed for all members of the Universe domain and yield S-Factors sentiment signatures 605.

The Distributor of 102 pushes sentiment signature vectors to the Public database 106, to populate the SUMMARY_BY_TICKER table (FIG. 4b).

Figure 7:
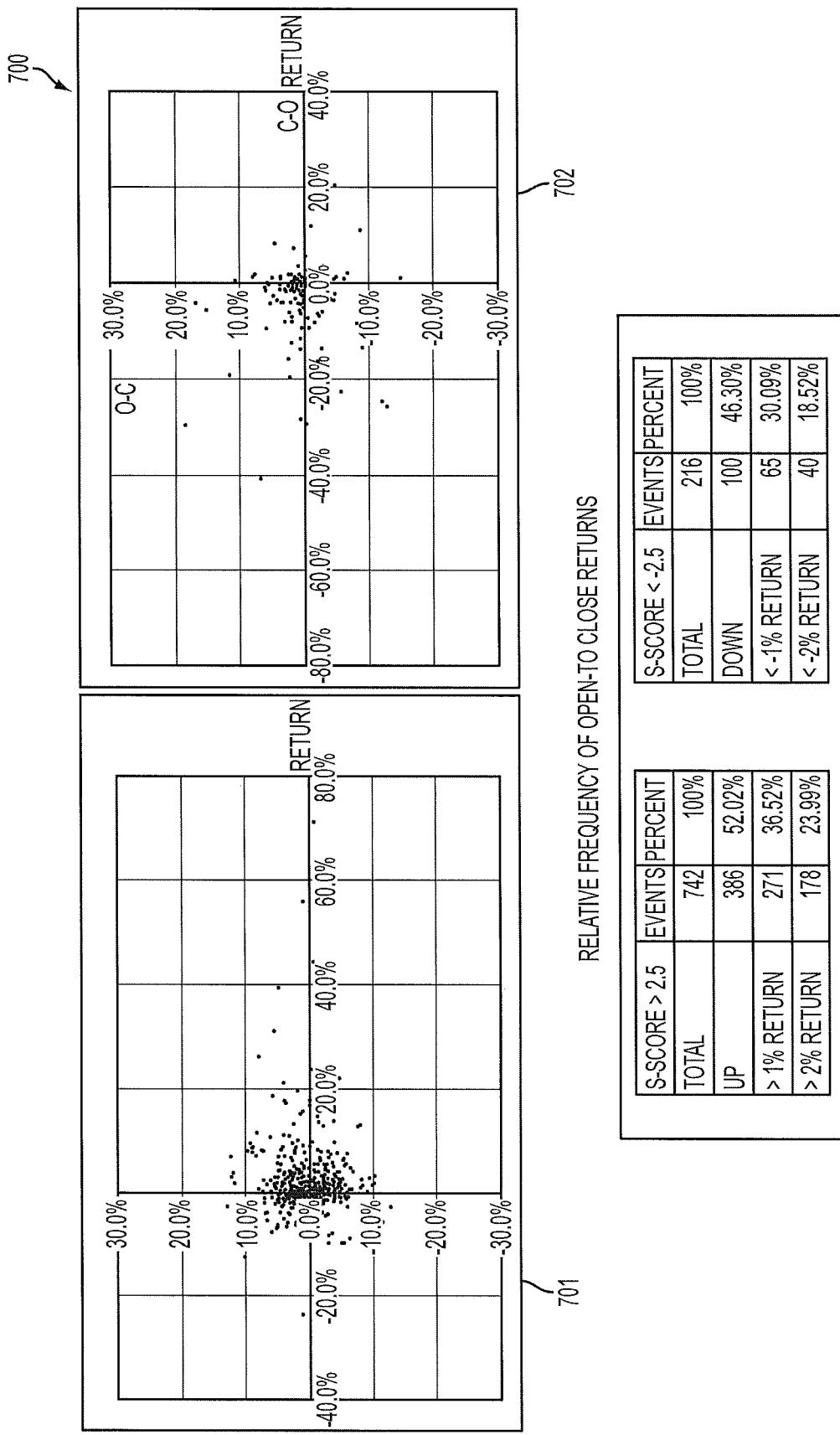
FIG. 7 presents the results of exploratory data analysis to support the usefulness of an example of the disclosed invention.

FIG. 7 presents initial exploratory data analysis 700 to support the usefulness of the disclosed invention. The analysis considers whether pre-market-open sentiment signatures are predictors of post-market-open price changes as shown by scatter plots of overnight (C-O) and open-to-close (O-C) price changes, for securities with large S-Scores. This is shown in 701 for stocks with S-Scores >2.5 and in 702 for stocks with S-Scores <−2.5. In each regime, the stocks had daily close prices greater than $5/share.

The horizontal axes are the percentage overnight price change (C-O). The vertical axes are the percentage open-to-close price change (O-C). These data are observed from a sample space of 197,000 events for the stock Universe captured during the first Quarter of 2012. The plots show the events that satisfy the stated conditions on S-Score and price.

The scatter plots show that pre-market-open S-Score is a very good estimator of the direction of market-at-open price changes. The scatter plot 701 for S-Score >2.5 has a large number of points in the right two quadrants while the scatter plot 702 for S-Score <−2.5 has a large number of points in the left two quadrants. This simple observation implies that Sentiment Calculation 601 employs accurate sentiment estimation algorithms.

The table 703 shows the relative frequency of open-to-close returns. The relatively large frequency of moves of greater than +2% and less than −2%, demonstrates that the S-Score filtered returns distribution has fat tails. For S-Score >2.5, 52% of open-to-close returns are up, 36.5% are up greater than 1% and 24% are up greater than 2%. For S-Score <−2.5, 46.3% of open-to-close returns are down, 30% are down more than −1%, and 18.5% are down greater than −2%. This observation implies that stocks with positive S-Scores tend to yield positive daily returns, while the converse is the case for stocks with negative scores.

Figure 8:
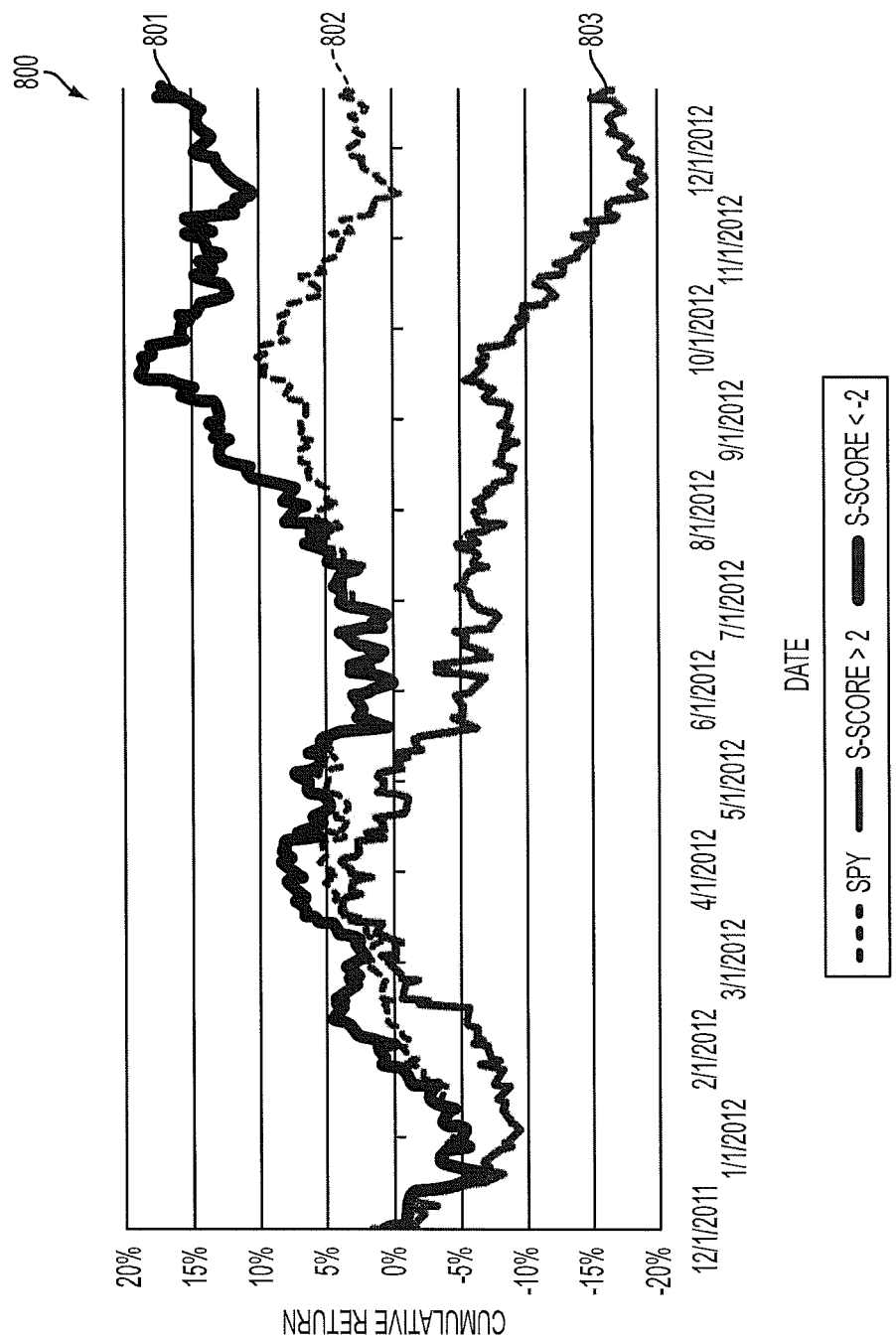
FIG. 8 shows the results of applying the sentiment signatures of one example of the disclosed invention in a portfolio management scenario.

FIG. 8 presents the results of investing in portfolios of stocks with large positive or large negative S-Scores and illustrates the utility of S-Factors to the financial market domain. The chart 800 shows the cumulative returns of portfolios established each day by purchasing stocks with large pre-market-open S-Scores estimated at 9:10 AM Eastern Time. Each day, the portfolios are established at the market open and are liquidated at the market close. The observation period extends from Dec. 1, 2011 to Dec. 21, 2012. The top line 801 shows the cumulative returns from stocks with positive S-Scores >2. The bottom line 803 shows the cumulative returns from stocks with negative S-Scores <−2. The dashed line 802 shows the cumulative returns over this period from a market benchmark, SPY, which is the SPDR S&P 500 Exchange Traded Fund that is designed to track the S&P 500 index.

The stocks with large positive S-Scores significantly outperformed SPY over this period, while the stocks with large negative S-Scores significantly underperformed relative to the market benchmark. A measure of the risk-adjusted performance for this sequence of portfolios is expressed in terms of their annualized Sharpe Ratios 900 as shown in FIG. 9.

The Sharpe Ratios were computed at the 95% confidence level with the R statistical programming language using the PerformanceAnalytics package.

Figure 10A:
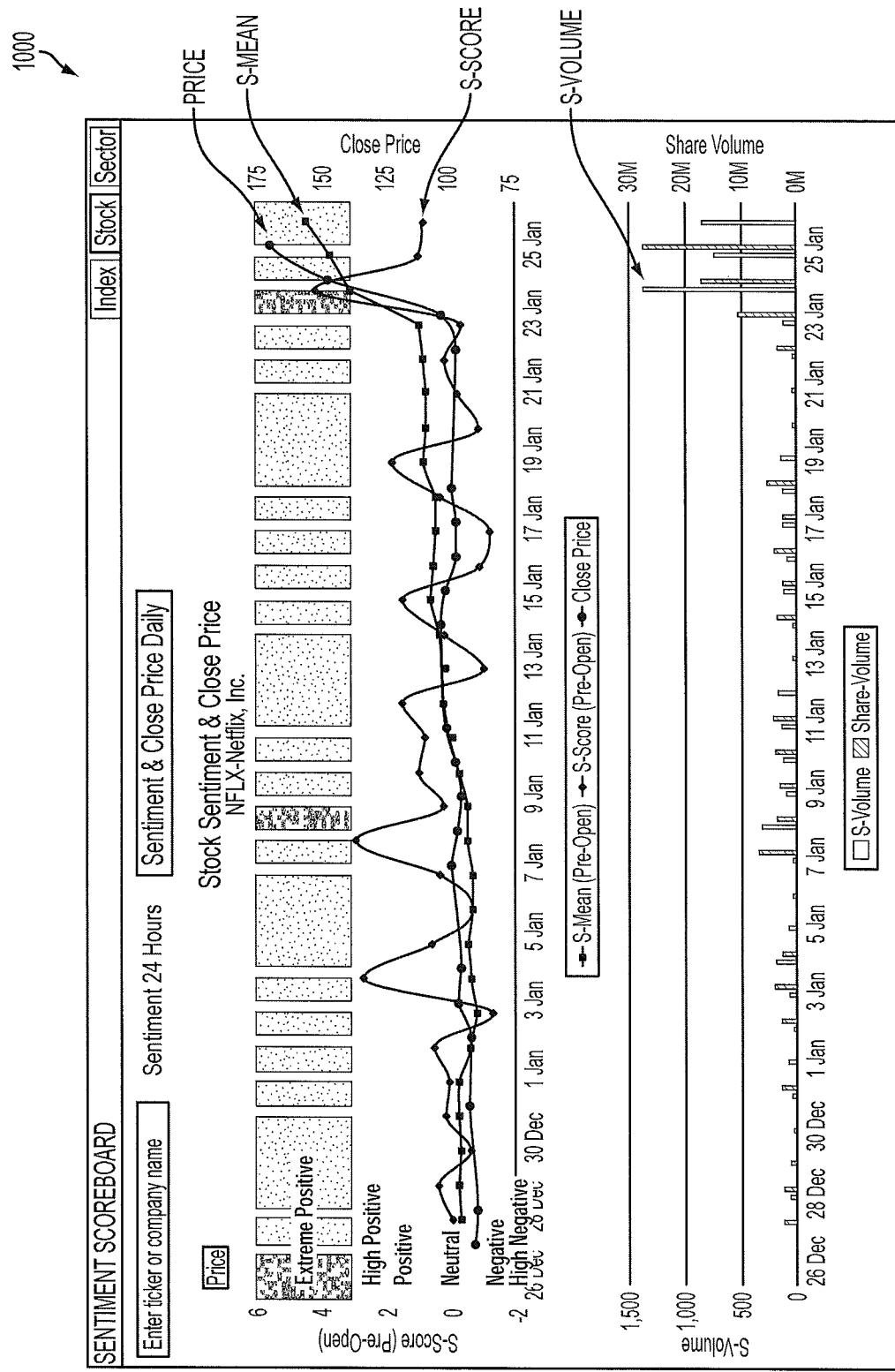
FIGS. 10a-10b show the behavior of the sentiment signatures of one example of the disclosed invention of a stock experiencing an unusual level of social media activity.
Figure 10B:
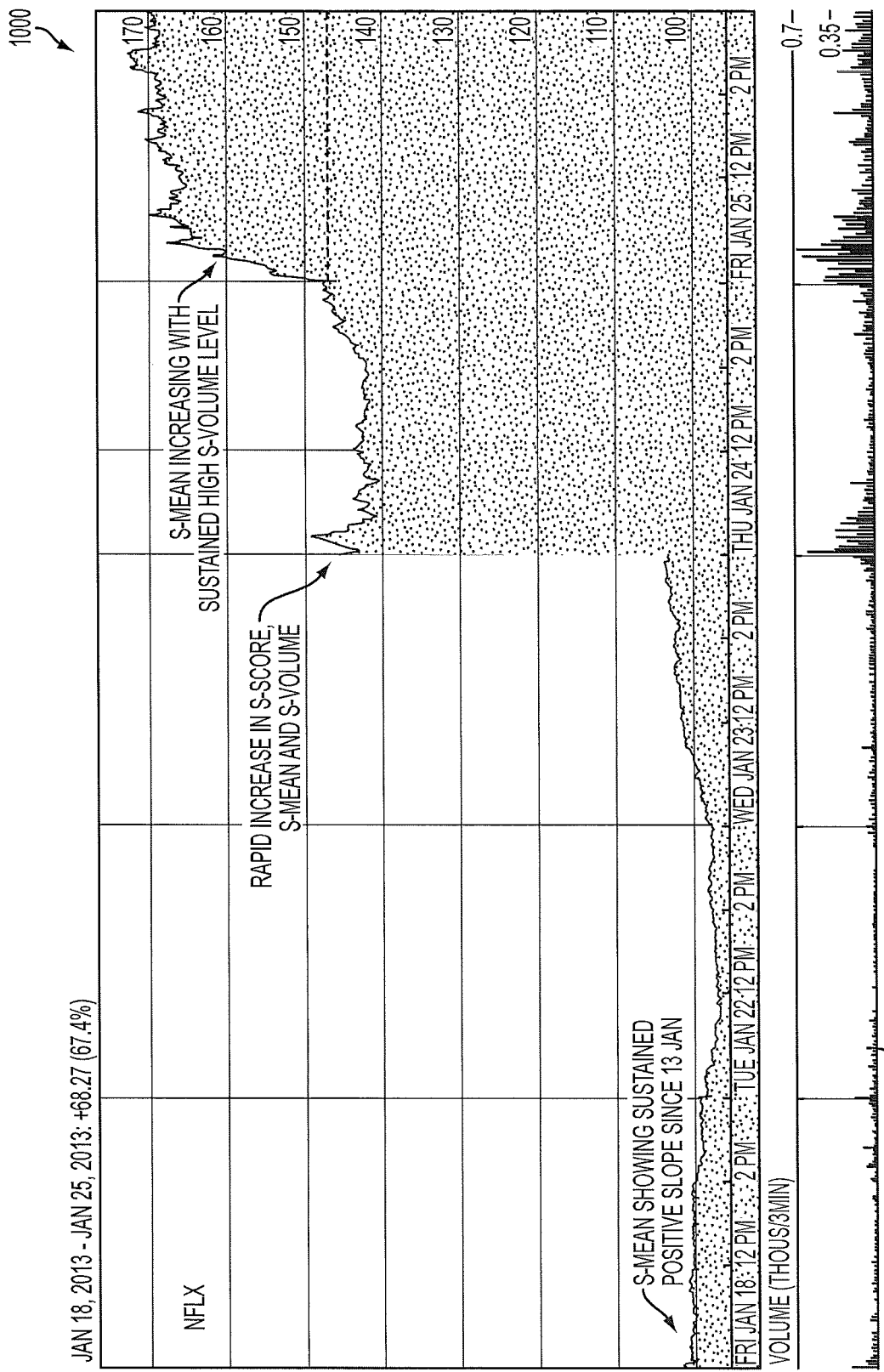

FIG. 10 shows the evolution of the sentiment signature 1000 for the stock of Netflix, Inc. (NFLX). During the week of Jan. 21, 2013, NFLX gained 71%, as the company reported quarterly earnings far higher than Wall Street analysts' estimates. Chart 1001 shows the graphical user interface from the web site of the disclosed invention and displays the behavior of the S-Score, S-Volume, and S-Mean metrics before and across the earnings event. Chart 1002 correlates features of the sentiment signature derived from micro-blogging message content and activity with the behavior of Netflix's stock price.

Figure 11A:
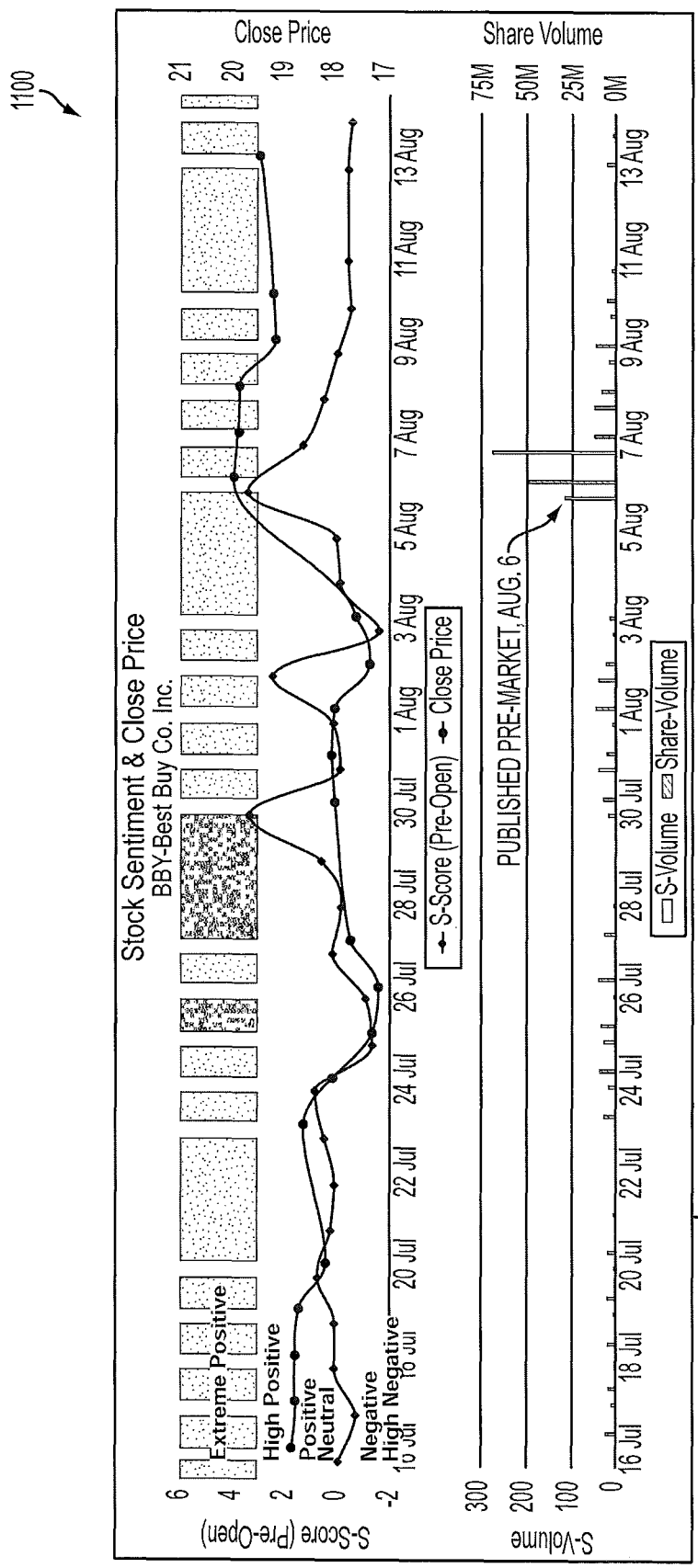
FIGS. 11a-11b show the behavior of the sentiment signatures of one example of the disclosed invention of a stock experiencing a significant, unexpected news release.
Figure 11B:
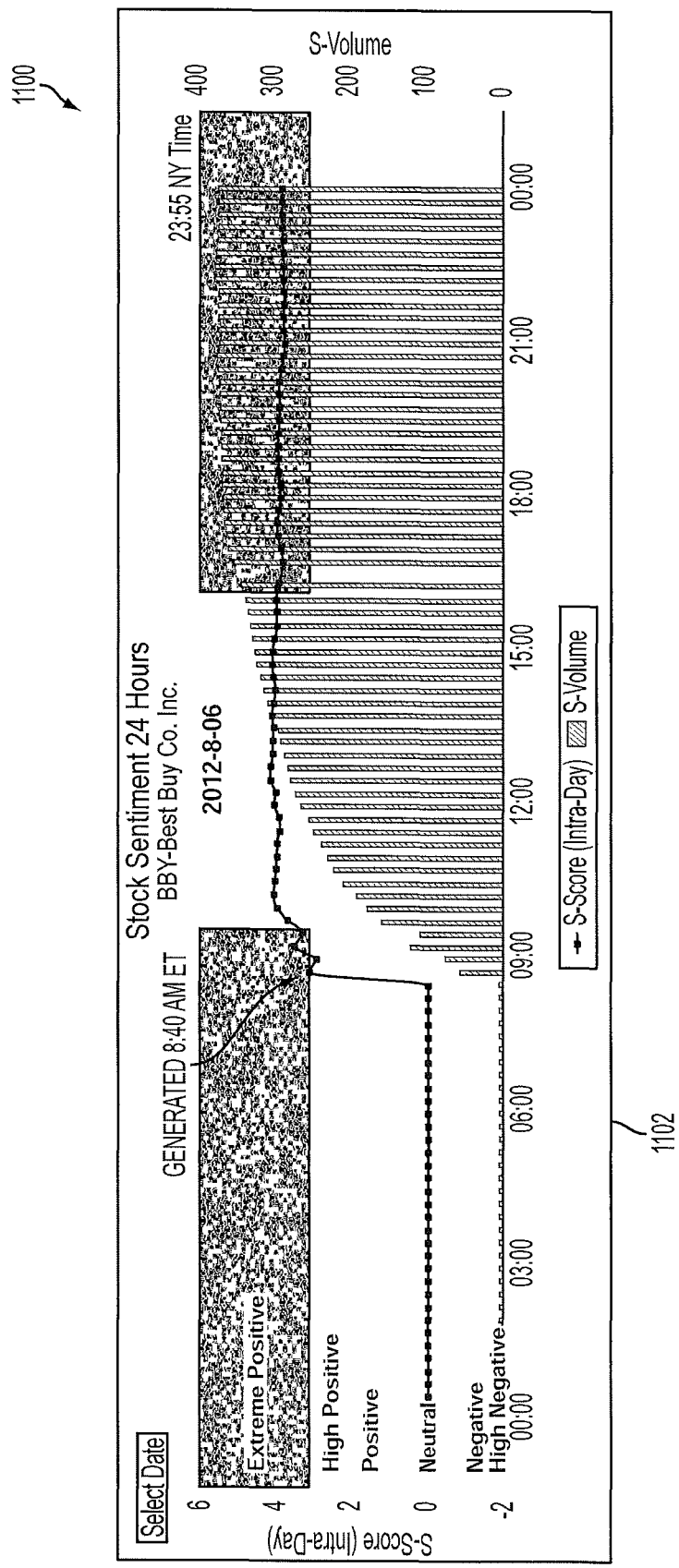
Figure 12A:
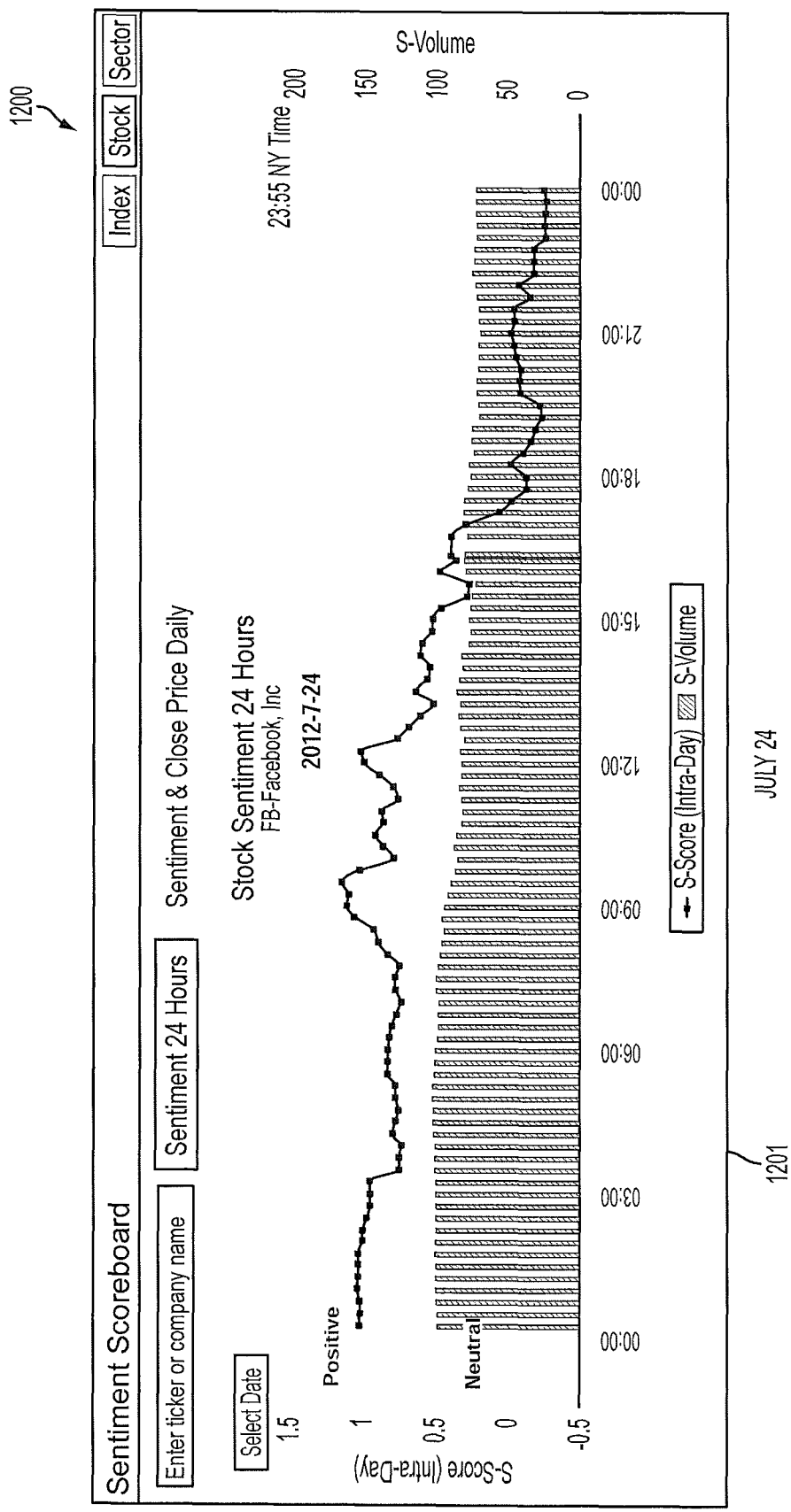
FIGS. 12a-12d show the behavior of the sentiment signatures of one example of the disclosed invention to detect dynamic sentiment signatures, evolving on intraday timescales, for a stock before, across, and after an earnings event.
Figure 12B:
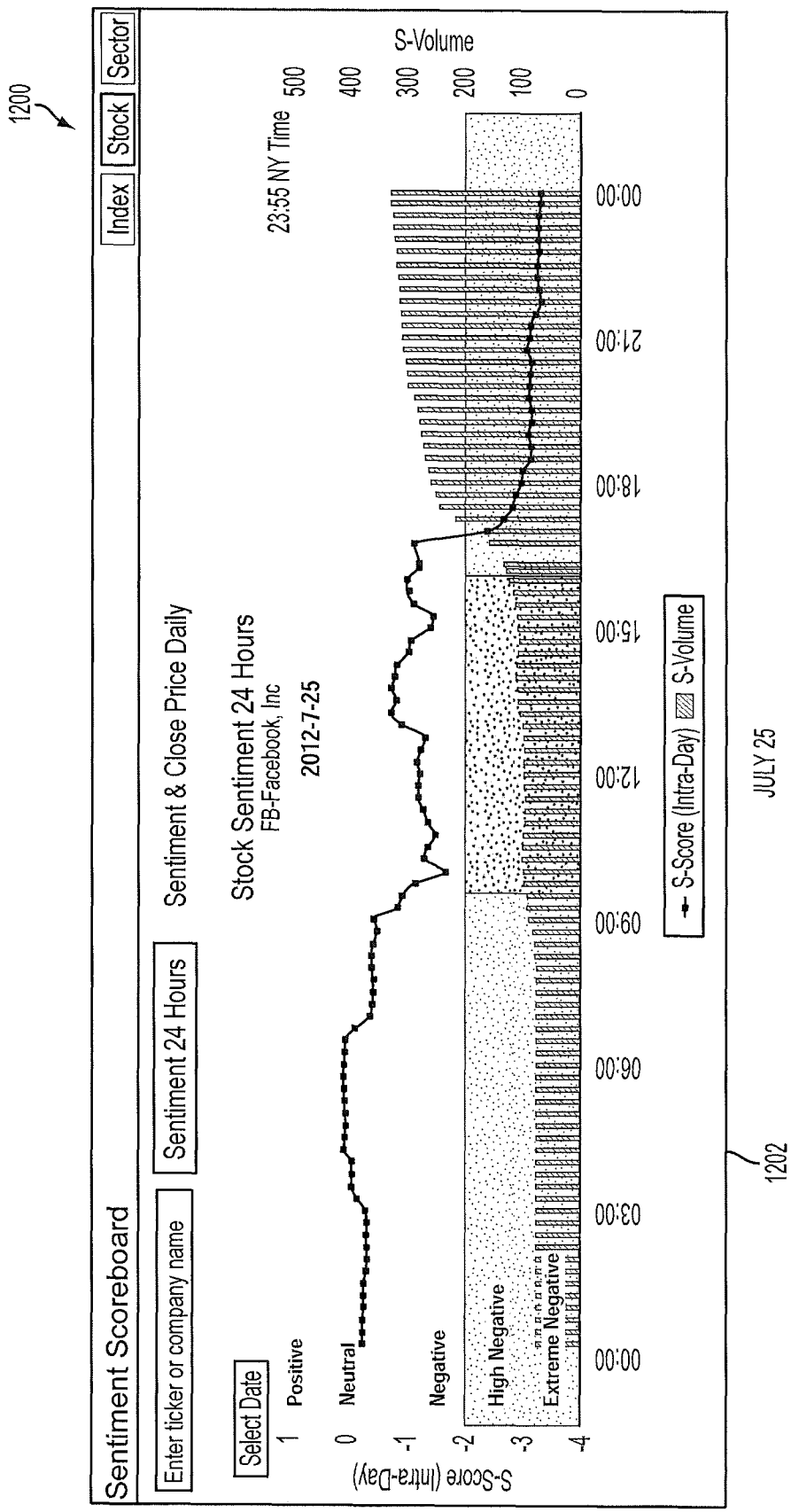
Figure 12C:
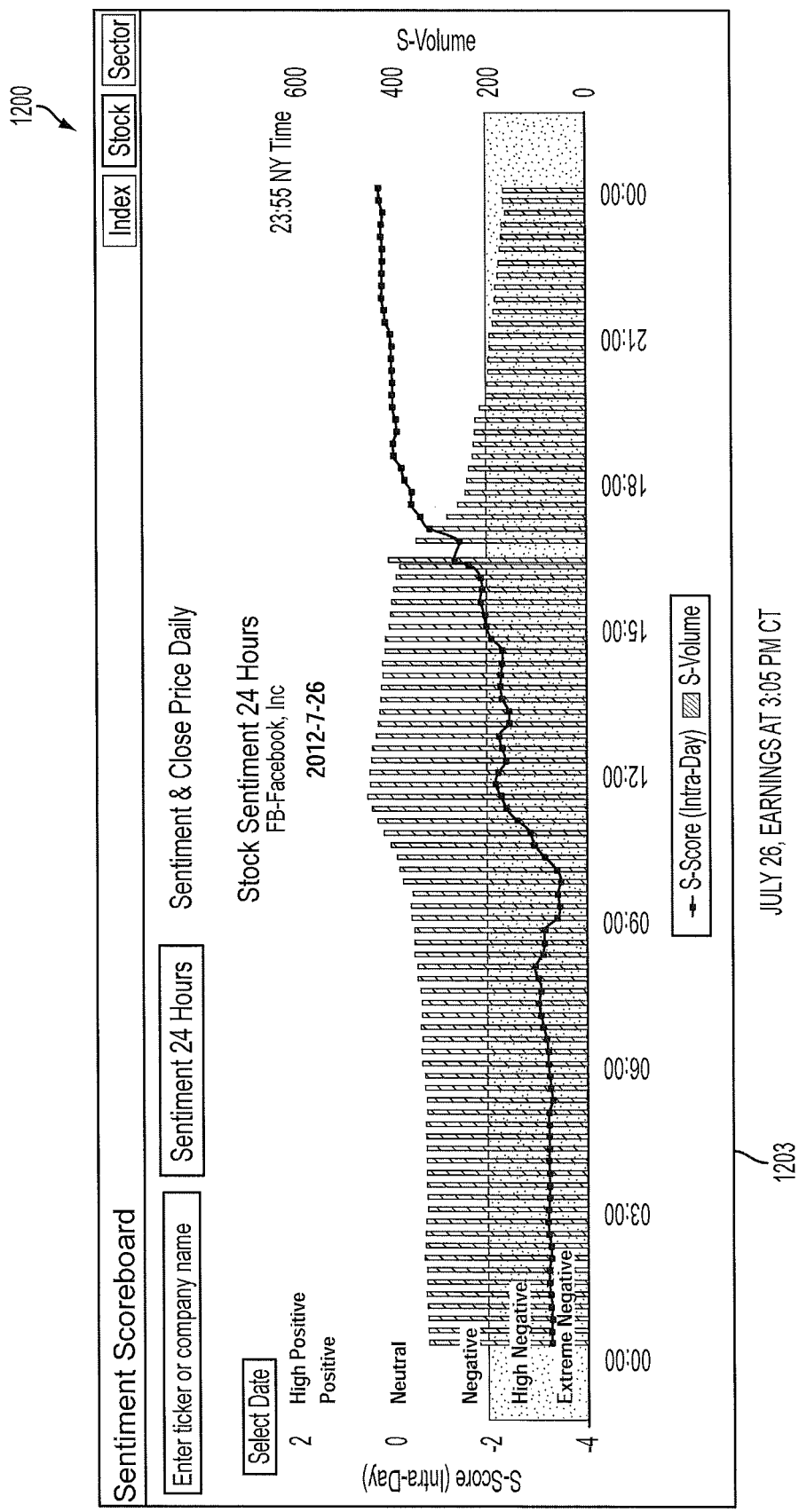
Figure 12D:
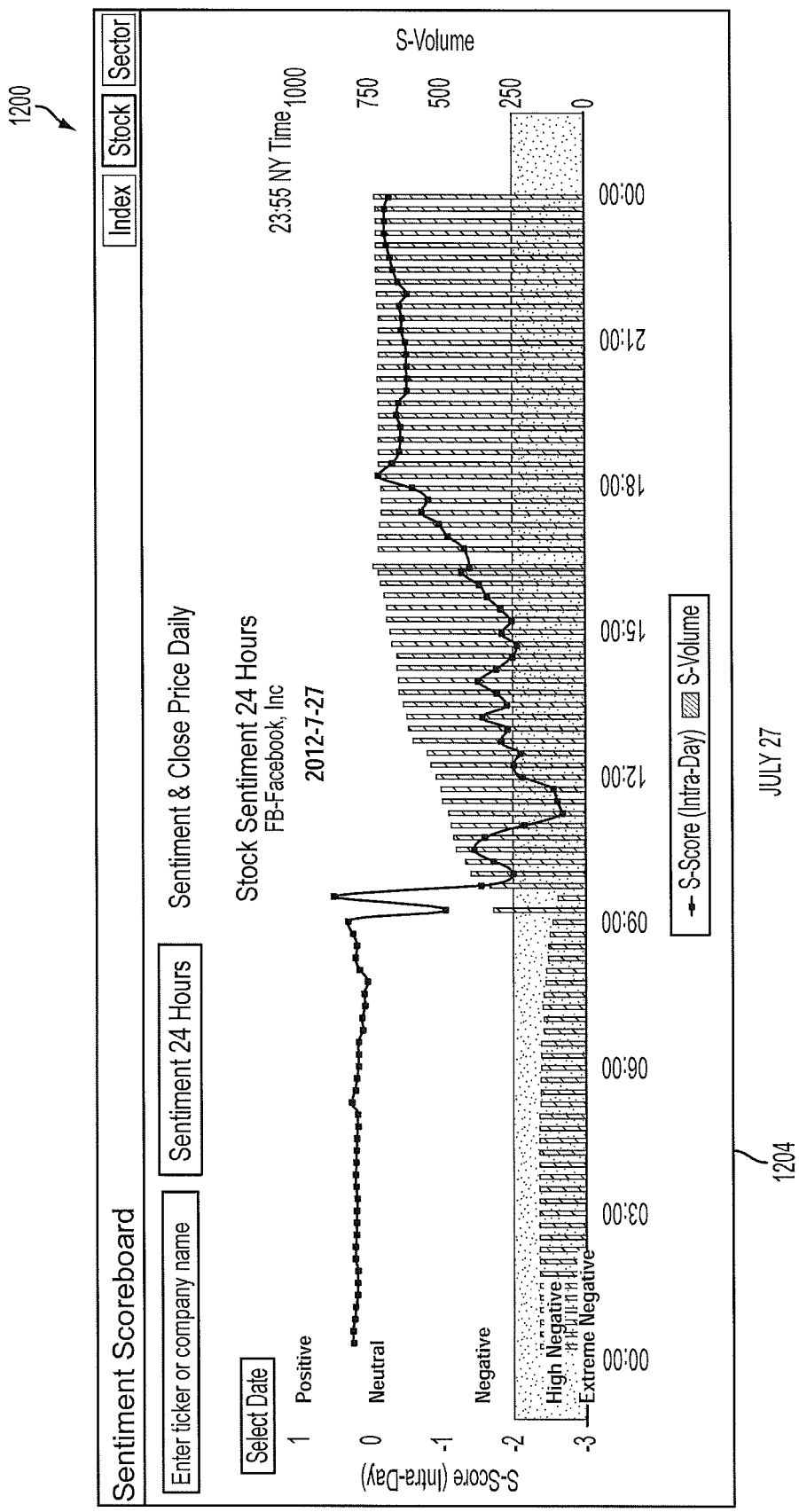

FIG. 11 demonstrates the capability of the disclosed invention to detect significant corporate news events from micro-blogging message content and activity 1100. Chart 1101 and chart 1102 show daily and intraday S-Score and S-Volume signatures for Best Buy Co., Inc. (BBY) on Aug. 6, 2012.

In the pre-market of Aug. 6, 2012, Richard Schulze, Founder and former Chairman of Best Buy Co., Inc., submitted a written proposal to the company's Board of Directors to acquire all outstanding shares of the company that he did not already own for a price of $24.00 to $26.00 per share in cash. The proposed purchase price was at a premium of 36% to 47% to Best Buy's closing stock price of $17.64 on Aug. 3, 2012. At the time, Schulze was Best Buy's largest shareholder, controlling 20.1% of BBY shares.

The announcement occurred after 8:15 AM Eastern time. In this example, the S-Factor metrics are computed continuously at 15 minute bucketed intervals intraday. The S-Factor metrics generated for BBY that day detected the leading edge of the social media signature of Schulze's announcement during the computation of the 8:30 AM bucket for Best Buy. Chart 1102 shows the dramatic change in Best Buy's S-Score and S-Volume levels as the news event unfolded. At that time, the takeover bid was viewed very favorably, resulting in a sharp transition to high positive sentiment levels and an unusual, rapid increase in social media activity for the stock as indicated by S-Volume.

The major financial news services (Bloomberg, Reuters, and Wall Street Journal) began publishing headline stories covering this development starting at 8:44 AM. This event is an excellent example showing that social media content and level of activity can be a leading indicator relative to traditional financial news services.

FIG. 12 shows the capability of the disclosed invention to detect dynamic sentiment signatures 1200 evolving on intraday timescales. The progression of intraday S-Score and S-Volume metrics for Facebook, Inc. (FB) is shown in 1200 (FIGS. 12a, 12b, 12c, 12d) from Jul. 24 through Jul. 27, 2012.

The company reported EPS of $0.12, in-line with analysts' estimates, and revenues of $1.18 billion, beating estimates by 2.6%. Yet, the stock sold off sharply, ending the week down 38% from its IPO price in May. The decline occurred amid concerns that revenues and user growth are slowing, significantly, and that business models remain immature, even at Facebook, the model of excellence for the new era of social networking, media, and advertising.

Facebook's sentiment signature entered a sustained down trend, starting around Noon on July 24 and reached extreme negative levels after the close on July 25. On July 26, the day of the earnings announcement, Facebook's S-Score maintained negative levels up to the time of the earnings data release at 3:05 PM Central Time.

After the announcement, sentiment levels relaxed to neutral after the close on July 26 and into the open of July 27. At the open of July 27, Facebook's S-Score made a rapid decline to negative levels, reaching high negative levels around 10 AM Central Time. Facebook's stock closed the day at $23.71, a decline of 11.8%.

Figure 13A:
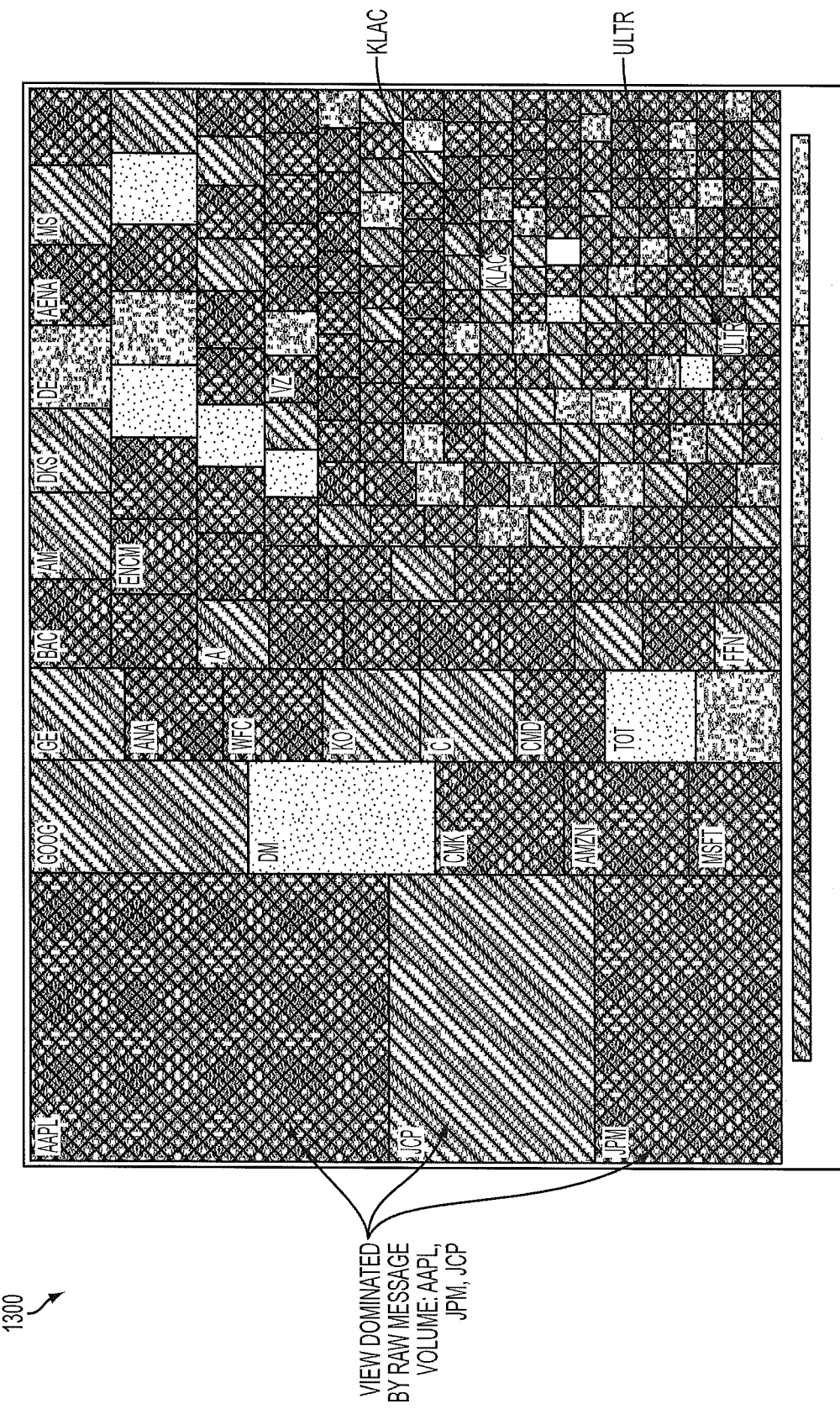
FIGS. 13a-13b show the application of the normalized representation of micro-blogging volume, presented in the disclosed invention, to improve and reveal features of sentiment signatures embedded in heat map visualizations of stock market trading sentiment.
Figure 13B:
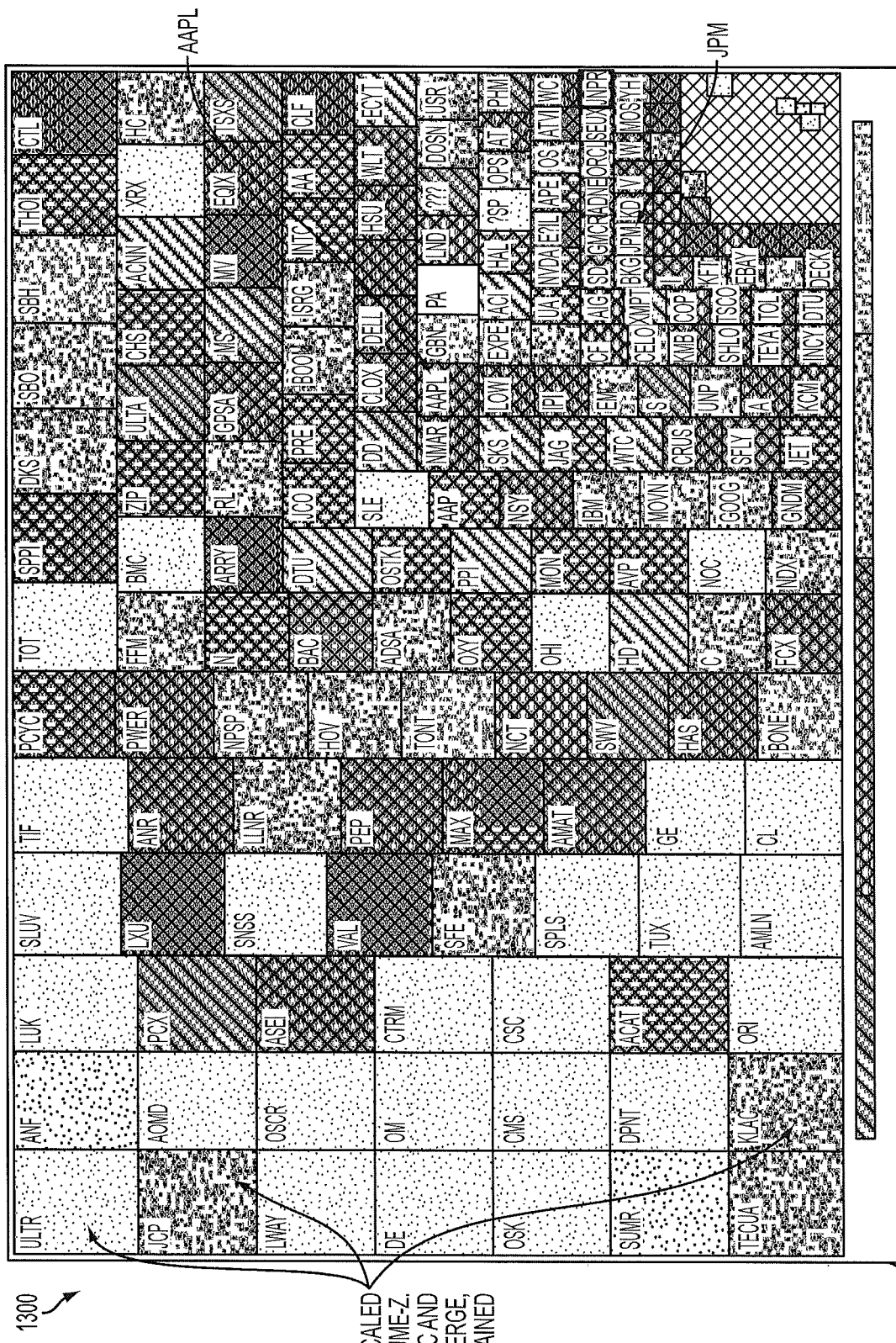

FIG. 13 demonstrates the use of S-Volume-z, the z-score normalized representation of micro-blogging volume presented in the disclosed invention, to reveal features of signatures embedded in heat map visualizations of stock market trading sentiment 1300. Chart 1301 shows the current practice to construct a market sentiment map, observable at sites such as StockTwits.com. In this visualization, a stock's color intensity level is mapped to some measure of trading sentiment for the stock, or to the stock's change in market price, or to the stock's share volume. The area on the map allocated to a particular stock is proportional to the raw number of micro-blogging messages observed for the stock over an observation period. Thus, the stocks with the largest total number of messages will occupy the largest areas on the map. Chart 1301 shows a typical scenario, observed on May 25, 2012, in which the stocks such as AAPL, GOOG, JPM, AMZN, and MSFT occupy large map areas, but have moderately positive, moderately negative, or neutral sentiment levels. Stocks such as AAPL, GOOG, and AMZN will always dominate the current visualization practice because these stocks consistently have high raw message volumes, each day, irrespective of sentiment content. Thus, the current practice has limited usefulness to detect significant changes in sentiment signatures. On that day, stocks such as KLAC and ULTR had extreme sentiment levels and significant changes from normal levels of message activity as measured by S-Volume-z, but are obscured simply because these had far fewer total number of micro-blogging messages compared to the dominate stocks.

The market map 1302 shows the result of rescaling where the areas are a function of a stock's S-Volume-z metric. In this representation, a number of stocks with extreme sentiment levels and unusual social media activity, such as KLAC and ULTR, are detected and emerge from the clutter of 1301. JCP was retained in the rescaling visualization 1302 because the stock had extreme negative sentiment and unusually high message volume on May 25. The high message volume stocks of that day, such as AAPL and JPM, occupy regions appropriate for their sentiment levels and historical normal message volume levels.

Figure 14A:
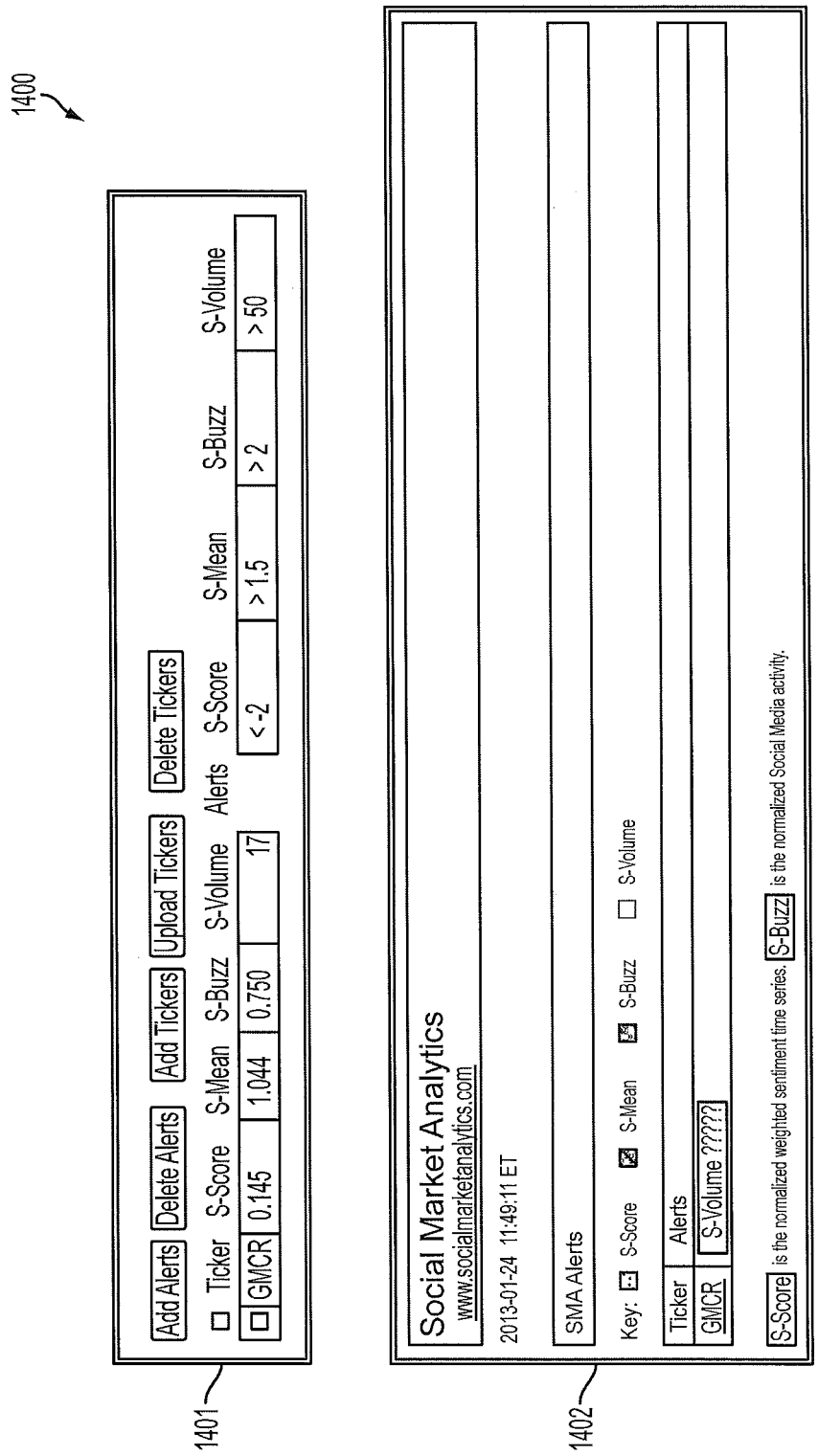
FIGS. 14a-14b demonstrate and interpret the sentiment signature alert capability according to one aspect of the disclosed invention.
Figure 14B:
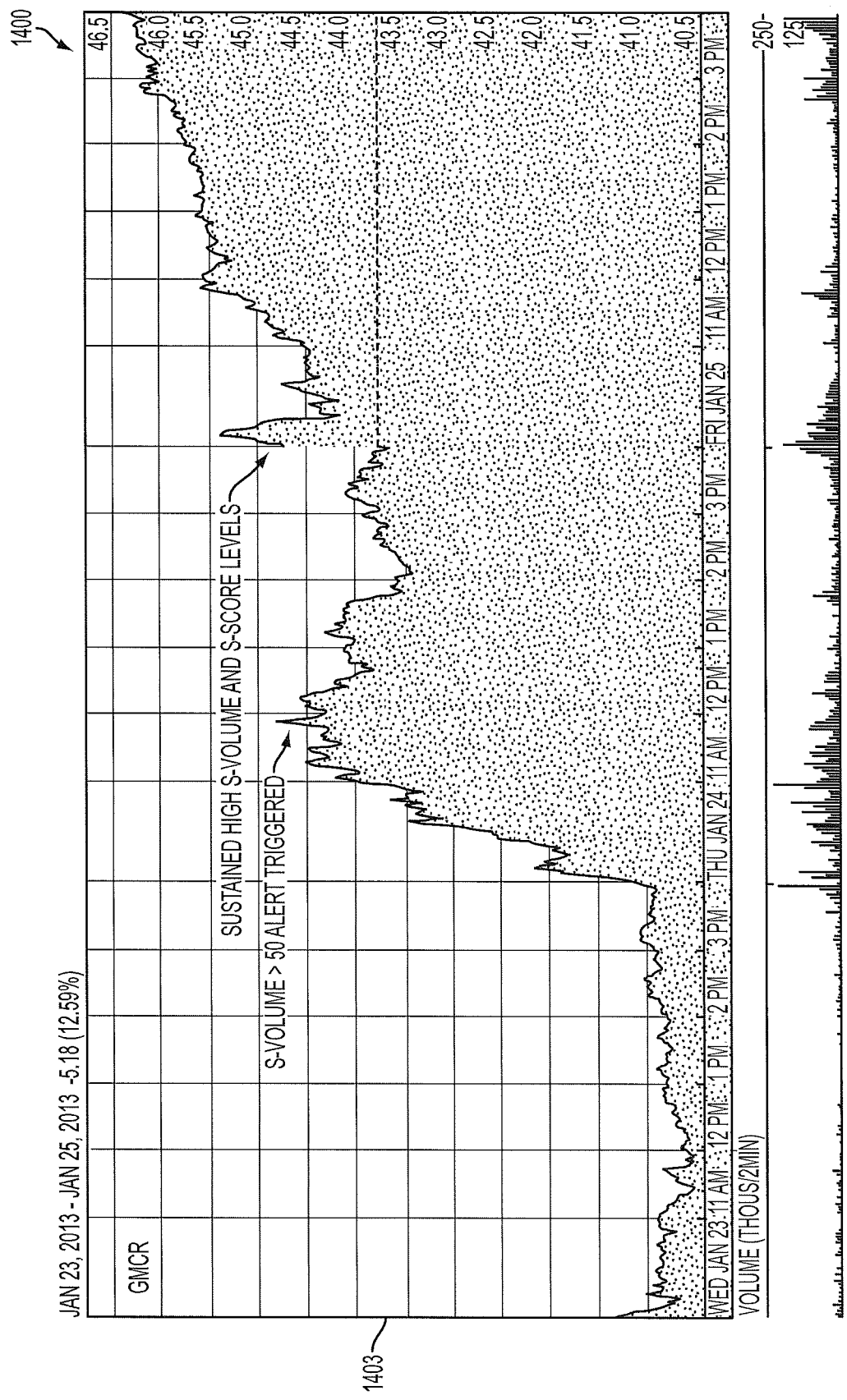

FIG. 14 demonstrates the sentiment signature alert capability 1400 of the disclosed invention. The graphical user interface 1401 enables users to set thresholds on any of four components of a stock's sentiment signature. 1401 shows thresholds set for S-Score <−2, S-Mean >1.5, S-Buzz >2, and S-Volume >50 for the stock of Green Mountain Coffee Roasters Inc. (GMCR). The alert structure sends an email to a user when any of the thresholds set by the user are exceeded. The S-Volume threshold was exceeded for GMCR at 11:49 AM Eastern Time on Jan. 24, 2013, and generated the alert email message 1402. The chart 1403 correlates the timing of the alert and other metrics with the behavior of GMCR's stock price. The alert served as an early indicator of increased social media activity for the stock. Confirmation came in the pre-market of January 25 as GMCR's S-Score increased to high positive levels and S-Volume continued to rise, increasing 78% above the levels of the previous day. On January 25, GMCR stock closed trading at $46.31, up 5.78% for the day.

The foregoing examples are made for illustrative purposes, and not to limit the present invention. The different embodiments and processes may be implemented in software, including individual applications, combined applications, and scripting languages, firmware, hardware, or combinations of the above.

What is claimed is:
1. A method of calculating a vector of sentiment metrics in a computer system, the method comprising:
   receiving messages via an application programming interface of at least one social media data source,
   identifying messages that contain a term of interest from a set of terms of interest as being relevant to that term of interest,
   identifying messages from non-filtered posting accounts as indicative messages;
   calculating a sentiment score for messages identified as both relevant to a term of interest and indicative based on sentiment values of words and phrases in the messages;
   bucketing sentiment scores of the messages identified as both relevant to a term of interest and indicative based the term of interest and a time stamp of the messages;

calculating a normalized sentiment time series score for the bucketed sentiment scores;

calculating a vector of sentiment metrics for a term of interest based on the normalized sentiment time series score; and distributing the vectors of sentiment metrics.

2. The method of claim 1, wherein low volume and malicious posting accounts are excluded from the non-filtered posting accounts.

3. The method of claim 1, wherein the step of distributing the vectors of sentiment metrics further comprises pushing the vectors of sentiment metrics to a table in a public database.

4. The method of claim 1, further comprising de-duplicating messages prior to calculating a sentiment score for messages.

5. The method of claim 1, wherein the normalized sentiment time series scores are weighted based on time stamps of each message.

6. The method of claim 5, wherein the weighting places more emphasis on newly arrived messages.

7. The method of claim 5, wherein the weighting is exponential.

8. The method of claim 1, wherein the set of terms of interest comprises a plurality of stock ticker symbols.

9. The method of claim 1, wherein the set of terms of interest correspond to publicly traded entities.

10. The method of claim 1, wherein the step of receiving messages via an application programming interface of at least one social media data source further comprises:

extracting raw data from the messages into a private database, the extracted raw data including at least a posting account, a posting time, and message contents; and parsing the raw data into tokenized data.

11. The method of claim 1, wherein the step of calculating a sentiment score for messages identified as both relevant to a term of interest and indicative based on sentiment values of words and phrases in the messages further comprises:

accessing a domain-specific sentiment dictionary; and obtaining a sentiment level for the words and phrases in the messages.

12. The method of claim 11, wherein the domain-specific sentiment dictionary has content and sentiment levels adapted to financial market terminology.

13. The method of claim 1, wherein the at least one social media data source comprises at least one micro-blogging data source, and the messages comprise microblogging messages.

14. A system for scoring messages from at least one social media data source, comprising a computer configured to include:

a term table in a relational database, the term table including a set of terms of interest;

an extractor, configured to receive messages via an application programming interface of at least one social media data source, to detect received messages having least one of the terms of interest, to extract raw data from the messages, and to store the extracted raw data in a message table in the database, the extracted raw data including at least a posting account, a posting time, and message contents;

an evaluator, configured to access the stored raw data in the message table, to parse the stored raw data into tokenized data, to store the tokenized data in a digest table, to detect terms of interest mentioned in the tokenized data, to analyze the raw data for indications of relevance, and to flag indicative messages in a digest score table;

a sentiment dictionary, the sentiment dictionary including sentiment values associated with words and phrases commonly expressed in relevant messages; and a calculator, configured to access a sentiment dictionary and to access the stored digest score table, the calculator further configured to calculate a sentiment score based on sentiment values of words and phrases in the tokenized data for messages tagged as indicative, and to calculate a vector of sentiment metrics for an term of interest based on the sentiment scores associated with the term of interest and falling within a predetermined lookback period, the calculator further configured to store the vector of sentiment metrics in a vector table;

wherein at least one of the sentiment metrics comprises a normalized representation of a sentiment time series score.

15. The system of claim 14, wherein the vector of sentiment metrics further comprises the z-score representation of the time series as follows:

$$S\_Score\ (t) = (S(t) - \mu(S(t)))/\sigma(S(t))$$

where $\mu S((t))$ is the mean and $\sigma(S(t))$ is the standard deviation of a sentiment score during the predetermined time interval.

16. The system of claim 14, wherein the vector of sentiment metrics comprises at least a normalized representation of a sentiment time series score over the predetermined lookback period, a smoothed weighted average of a sentiment time series score over the predetermined lookback period, a volume of indicative messages, and a change in volume of indicative messages relative to the average volume level of relevant messages.

17. The system of claim 14, wherein the vector of sentiment metrics comprises at least a normalized representation of a sentiment time series score over the predetermined lookback period and a measure of diversity of posting accounts contributing to the sentiment time series score.

18. The system of claim 14, wherein the vector of sentiment metrics comprises at least a normalized representation of a sentiment time series score over the predetermined lookback period and a measure of the change in sentiment volume relative compared to the average level observed for a sentiment Universe.

* * * * *

UNITED STATES PATENT AND TRADEMARK OFFICE
CERTIFICATE OF CORRECTION

Page 1 of 1

PATENT NO. : 10,846,479 B2
APPLICATION NO. : 16/018953
DATED : November 24, 2020
INVENTOR(S) : Jeffrey G. Blaschak et al.

It is certified that error appears in the above-identified patent and that said Letters Patent is hereby corrected as shown below:

In the Specification

Column 2, Line 33, should read:
"received micro-blogging messages having at least one of the"

Column 3, Line 26, should read:
"according to a predetermined calculation interval. In one"

In the Claims

Column 14, Line 1, Claim 14 should read:
"at least one of the terms of interest, to extract raw data"

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*